(12) United States Patent
Yoshida

(10) Patent No.: US 8,416,304 B2
(45) Date of Patent: Apr. 9, 2013

(54) INPUT DEVICE OF APPARATUS USING DOT PATTERN, RECEIVER OF CONTROLLED APPARATUS, TERMINAL, AND PAPER CONTROLLER

(76) Inventor: Kenji Yoshida, Tokyo (JP)

(*) Notice: Subject to any disclaimer, the term of this patent is extended or adjusted under 35 U.S.C. 154(b) by 0 days.

(21) Appl. No.: 12/664,270

(22) PCT Filed: Jun. 13, 2008

(86) PCT No.: PCT/JP2008/061287
§ 371 (c)(1),
(2), (4) Date: Sep. 13, 2010

(87) PCT Pub. No.: WO2008/153219
PCT Pub. Date: Dec. 18, 2008

(65) Prior Publication Data
US 2010/0321502 A1  Dec. 23, 2010

(30) Foreign Application Priority Data
Jun. 13, 2007 (JP) ................................ 2007-156917

(51) Int. Cl.
*H04N 5/33* (2006.01)

(52) U.S. Cl.
USPC ........................................... 348/164; 348/162

(58) Field of Classification Search .................. 348/162, 348/164
See application file for complete search history.

(56) References Cited

U.S. PATENT DOCUMENTS
7,622,182 B2 * 11/2009 Wang et al. ................... 428/204

* cited by examiner

*Primary Examiner* — Mohamed Wasel
(74) *Attorney, Agent, or Firm* — Konomi Takeshita

(57) ABSTRACT

A paper remote controller system capable of registering and controlling a plurality of apparatuses with an easy manipulation and superior in convenience and flexibility is provided. The input system for an apparatus using a dot pattern comprises a reading unit for reading out a dot pattern formed based on a predetermined rule on a medium surface, a converting unit for analyzing a dot pattern from image information of the dot pattern read out by the reading unit and converting the dot pattern into a dot code corresponding to the dot pattern, an infrared code table for registering one or a plurality of infrared codes that are related with the dot code, and a control unit for causing an infrared code read out from the infrared code table to be irradiated from an infrared emission unit to a control-subject apparatus.

15 Claims, 33 Drawing Sheets

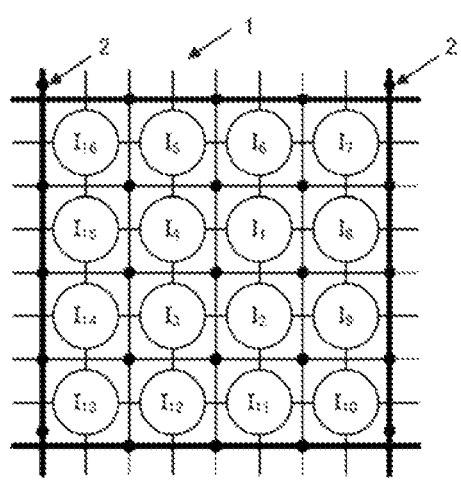 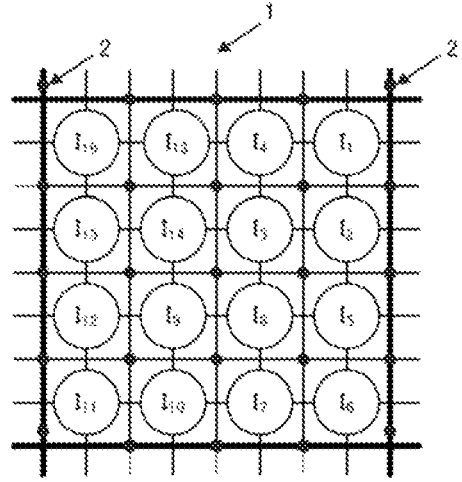
FIG.7A  FIG.7B
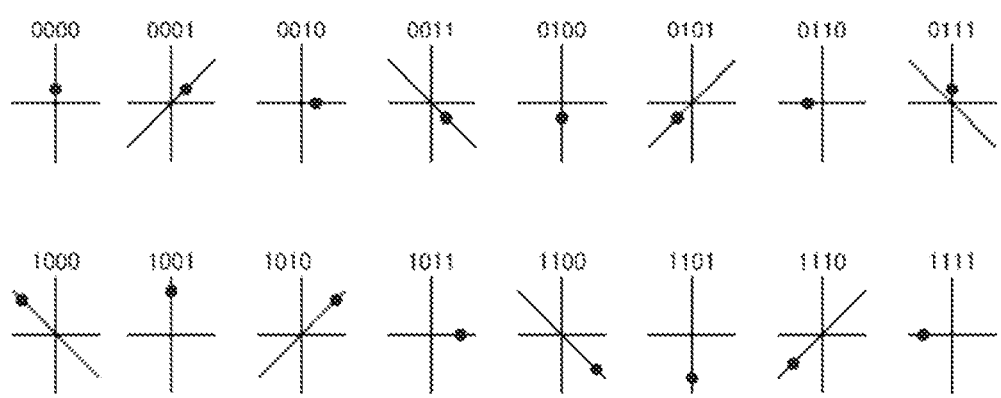
FIG.8

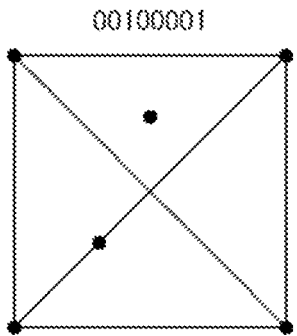
FIG.9A
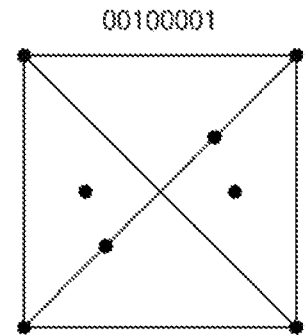
FIG.9B
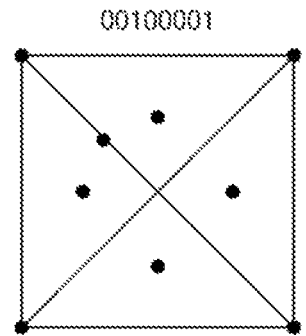
FIG.9C
| $I_3$ | $I_4$ | $I_5$ |
|---|---|---|
| $I_2$ | $I_1$ | $I_6$ |
2 × 3
FIG.10A
| | | $I_5$ |
|---|---|---|
| $I_2$ | $I_1$ | $I_6$ |
| $I_9$ | $I_8$ | $I_7$ |
3 × 3
FIG.10B
| $I_5$ | $I_6$ | $I_7$ |
|---|---|---|
| $I_4$ | $I_1$ | $I_8$ |
| $I_3$ | $I_2$ | $I_9$ |
| $I_{12}$ | $I_{11}$ | $I_{10}$ |
3 × 4
FIG.10C
| $I_{36}$ | $I_{17}$ | $I_{18}$ | $I_{19}$ | $I_{20}$ | $I_{21}$ |
|---|---|---|---|---|---|
| $I_{35}$ | $I_{16}$ | $I_5$ | $I_6$ | $I_7$ | $I_{22}$ |
| $I_{34}$ | $I_{15}$ | $I_4$ | $I_1$ | $I_8$ | $I_{23}$ |
| $I_{33}$ | $I_{14}$ | $I_3$ | $I_2$ | $I_9$ | $I_{24}$ |
| $I_{32}$ | $I_{13}$ | $I_{12}$ | $I_{11}$ | $I_{10}$ | $I_{25}$ |
| $I_{31}$ | $I_{30}$ | $I_{29}$ | $I_{28}$ | $I_{27}$ | $I_{26}$ |
6 × 6
FIG.10D

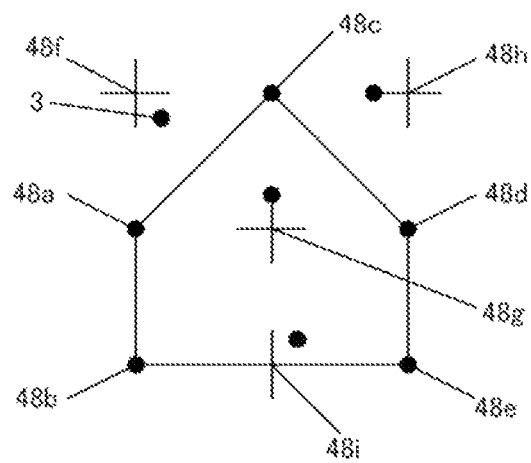
FIG.11A
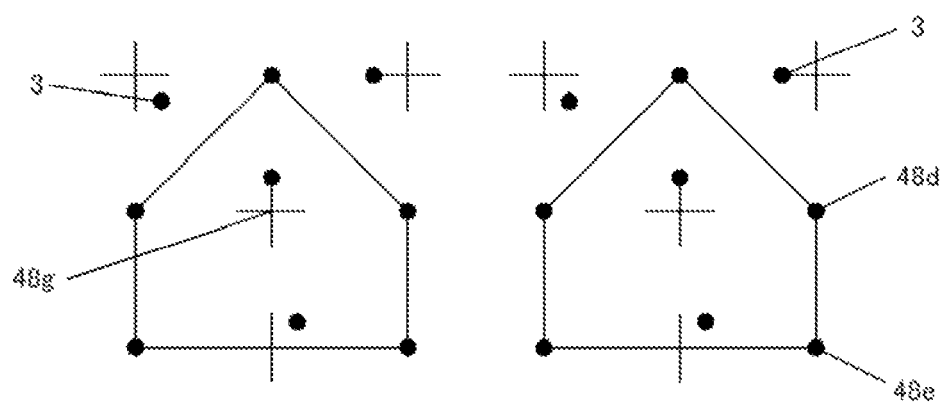
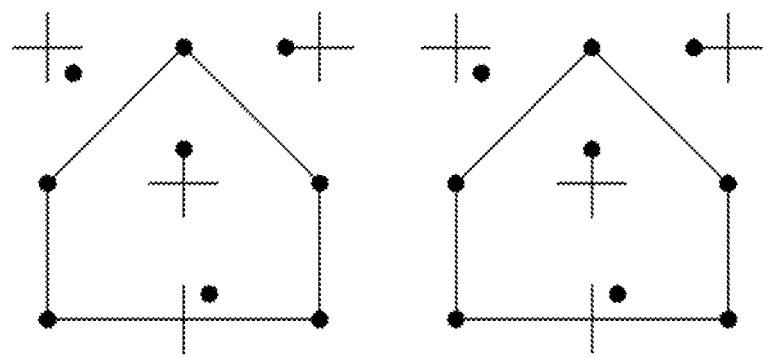
FIG.11B

FIG.13A — OPERATION INSTRUCTION CODE / MANUFACTURER CODE / PARITY

FIG.13B — Y COORDINATE / X COORDINATE / OPERATION INSTRUCTION CODE / MANUFACTURER CODE / PARITY

FIG.13C — X COORDINATE / Y COORDINATE / PARITY

INFRARED CODE TABLE

| DOT CODE | INFRARED CODE | |
|---|---|---|
| 43101 | XXXX MANUFACTURER | POWER ON/OFF |
| 43102 | | TERRESTRIAL BROADCAST CHANNEL 1 |
| 43103 | | TERRESTRIAL BROADCAST A CHANNEL 2 |
| ⁓ | | ⁓ |
| 43121 | | BS CHANNEL 1 |
| 43122 | | BS CHANNEL 2 |
| ⁓ | | ⁓ |
| 43200 | | |

FIG.17

UPDATING INFRARED CODE TABLE

| DOT CODE | INFRARED CODE | |
|---|---|---|
| 4001 ⁓ 4100 | A MANUFACTURER | TV OPERATION CODE |

FIG.22A

| DOT CODE | INFRARED CODE | |
|---|---|---|
| 4001 ⁓ 4100 | A MANUFACTURER | TV OPERATION CODE |
| 4201 ⁓ 4300 | A MANUFACTURER | CD PLAYER OPERATION CODE |
| 5001 ⁓ 5200 | B MANUFACTURER | STB OPERATION CODE |

FIG.22B

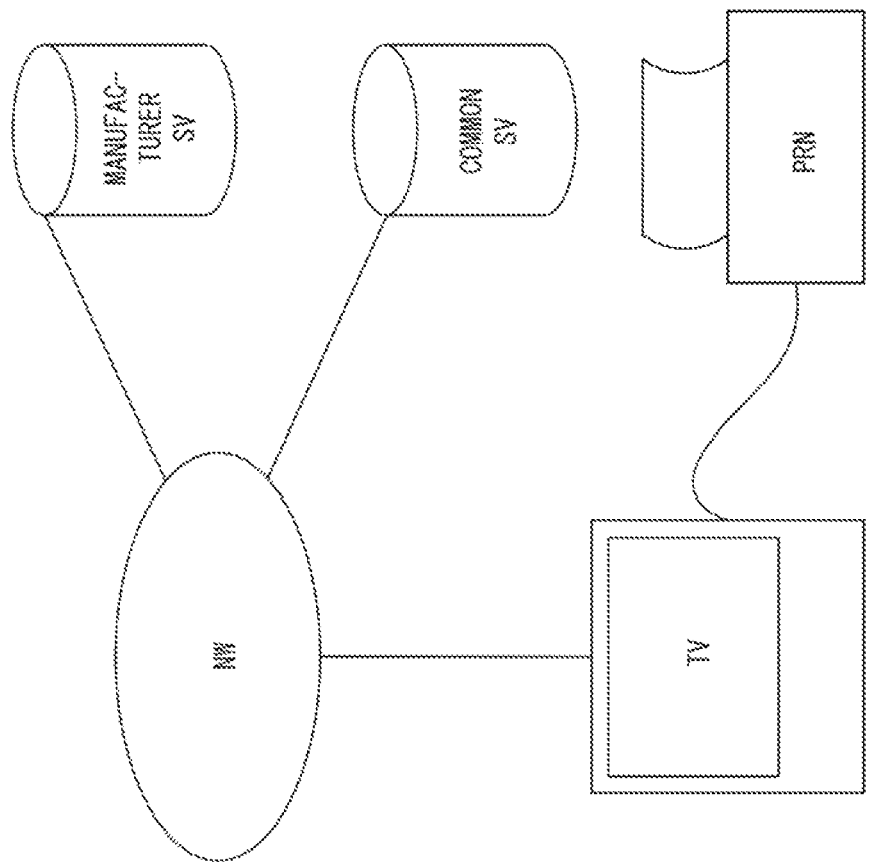
FIG. 37

INPUT DEVICE OF APPARATUS USING DOT PATTERN, RECEIVER OF CONTROLLED APPARATUS, TERMINAL, AND PAPER CONTROLLER

CROSS REFERENCE TO RELATED APPLICATIONS

This application claims priority under 35 U.S.C. 119 based upon Japanese Patent Application Serial No. 2007-156917, filed on Jun. 13, 2007. The entire disclosures of the aforesaid applications are incorporated herein by reference.

The present invention relates to a remote manipulation system for home electric appliances, using a dot pattern printed on a paper-form medium.

FIELD OF THE INVENTION

Home electric appliances are showing significant progress recently, with new products developed and released day after day. In step with such situation, the number of home electric appliances owned by a general household is also increasing.

Many of such home electric appliances are controlled using a remote controller (hereafter, referred as "remocon").

In general, a remocon is equipped for each home electric appliance. As a result, if the number of home electric appliances owned by each household increases, the number of remocon also increases.

When a user controls a home electric appliance, the user has to find a remocon for the appliance to control the appliance, which raises problems of hassle for finding a remocon, cumbersome manipulation, and lack of convenience.

To solve such problems, a pre-set remocon is available. A pre-set remocon is a remocon of which memory incorporates remocon data for a number of manufacturers in advance, and if a user sets the remocon to the manufacturer of a home electric appliance that the user owns, the home electric appliance can be controlled.

However, the pre-set remocon also has problems of a cumbersome procedure for setting the remocon to a particular manufacturer and home electric appliance and requiring much time until a user is accustomed to the setting procedure. Moreover, if a user is not accustomed to the setting procedure, setting may be conducted incorrectly and a home electric appliance different from the desired one may be mistakenly set.

To solve such problems, a remote control system such as Japanese Patent Application Publication No. 2007-110350 is suggested. In the remote control system described in Japanese Patent Application Publication No. 2007-110350, an apparatus to be controlled by a remocon has an information presentation unit, such as a Radio Frequency IDentification (RFID) or a barcode, which presents apparatus identification information that is unique to the apparatus to be controlled. An information reading unit, such as a RFID reader or a barcode reader, is equipped with the remocon to retrieve apparatus identification information. If a user performs key manipulation on the remocon while directing the remocon to the direction of the information presentation unit equipped with a desired apparatus to be controlled, a remote control signal that is used for the desired apparatus to be controlled is generated and sent in accordance with the key manipulation. In this way, one remocon unit can easily control a desired apparatus to be controlled, without necessitating a user to register the apparatus to be controlled and to select the apparatus to be controlled on the remocon.

BACKGROUND OF THE INVENTION

However, in Japanese Patent Application Publication No. 2007-110350. each apparatus to be controlled has to have unique apparatus identification information, raising problems where a producing process for an apparatus becomes complicated and costs become higher. Moreover, if a remocon is not directed to the correct direction while manipulating the remocon, the remocon is possibly retrieve apparatus identification information of an apparatus to be controlled that is different from the desired apparatus to be controlled, which is a problem of lacking manipulation easiness and convenience for a user.

The present invention was undertaken in consideration of such points. The present invention proposes a paper remocon system that is capable of registering and controlling a plurality of apparatuses and superior in convenience and flexibility.

SUMMARY OF THE INVENTION

In a first aspect of the present invention, there is provided an input device for an apparatus using a dot pattern comprising: a reading unit for reading out a dot pattern formed based on a predetermined rule on a medium surface; a converting unit for analyzing a dot pattern from image information of the dot pattern read out by the reading unit and converting the dot pattern into a dot code corresponding to the dot pattern: an infrared code table for registering one or a plurality of infrared codes that are related with the dot code; and a control unit for causing an infrared code read out from the infrared code table to be irradiated from an infrared emission unit to a control-subject apparatus, or when the infrared code corresponding to the dot code does not exist in the infrared code table, causing an infrared code where a manufacturer code defined for the control-subject apparatus or a predetermined specific manufacturer code is added to the read-out dot code to be irradiated from the infrared emission unit to the control-subject apparatus.

According to this, since a control-subject apparatus is allowed to be controlled only by reading a dot pattern on a medium, the manipulation is easy, thereby enhancing affinity for a user.

In a second aspect of the present invention, there is provided the input device for the apparatus using the dot pattern, according to the first aspect, in which, the infrared codes to be registered to the infrared code table include the manufacturer code, signifying a manufacturer name of the control-subject apparatus, and an operation instruction code.

In a third aspect of the present invention, there is provided the input device for the apparatus using the dot pattern according to the second aspect, in which, at least one or a plurality of manufacturer codes may be registered in the infrared code table.

According to this, one input device can control a variety of electric products including audio products, televisions of a plurality of manufacturers.

In a forth aspect of the present invention, there is provided the input device for the apparatus using the dot pattern according to any one of first to third aspects, in which, in the infrared code table, a plurality of infrared codes are related with one dot code, and the control unit controls the infrared emission unit such that the infrared emission unit irradiates the plurality of infrared codes continuously or in a predetermined interval to the control-subject apparatus.

According to this, a plurality of operations may be performed only by one click on a paper controller by a user, thereby enhancing convenience and operability for a user.

In a fifth aspect of the present invention, there is provided the input device for the apparatus using the dot pattern according to the first aspect, in which, if a dot code obtained from a dot pattern read out by the reading unit includes a dot code transmit command code, the control unit causes an infrared code where the read-out dot code is added to the manufacturer code to be irradiated from the infrared emission unit to the control-subject apparatus.

In a sixth aspect of the present invention, there is provided the input device for the apparatus using the dot pattern according to the first aspect, in which, if a dot code obtained from a dot pattern read out by the reading unit includes a specific manufacturer code that signifies a specific manufacturer name, the control unit causes an infrared code where the read-out dot code is added to the specific manufacturer code to be irradiated from the infrared emission unit to the control-subject apparatus.

In a seventh aspect of the present invention, there is provided a receiver of a control-subject apparatus, which receives a dot code, to which the manufacturer code according to the first or fifth aspect or the specific manufacturer code according to the first or sixth aspect is added, as an infrared code, the receiver for the control-subject apparatus comprising: a receiving unit for receiving the infrared code; an operation table in which an operation instruction code for the control-subject apparatus related to the dot code is registered; and an operation control unit for causing the control-subject apparatus to perform an operation based on the operation instruction code, in which, if the operation control unit reads out an infrared code which includes the dot code, the operation control unit causes the control-subject apparatus to perform an operation according to the dot code.

In an eighth aspect of the present invention, there is provided the receiver for the control-subject apparatus according to the seventh aspect, in which, if the operation control unit refers to the operation table and an operation instruction code corresponding to the dot code does not exist, the operation control unit accesses a predetermined and specified server through a network and transmits the specified server the read-out dot code to follow a process and instruction of the specified server.

In a ninth aspect of the present invention, there is provided the receiver for the control-subject apparatus according to the seventh aspect, in which, if the dot code includes an instruction to access a specified server, the operation control unit accesses the specified server through a network and transmits the specified server the read-out dot code to follow a process and instruction of the specified server.

In a tenth aspect of the present invention, there is provided the receiver for the control-subject apparatus according to the seventh aspect, in which, if the operation control unit receives a dot code to which a specific manufacturer code is added, the operation control unit accesses a predetermined and specified server through a network and transmits the specified server the read-out dot code to follow a process and instruction of the specified server.

In a eleventh aspect of the present invention, there is provided a terminal device for registering a new control-subject apparatus to the input device according to any one of first to sixth aspects so that the new control-subject apparatus can be controlled by the input device, wherein the terminal device transfers an infrared code table or infrared code data to be registered to the infrared code table from a server connected through a network or a storage medium mounted on the terminal device to the input device to update the infrared code table.

In a twelfth aspect, there is provided the input device according to any one of the first to sixth aspects, in which, the input device updates an infrared code table by transferring an infrared code table or infrared code data to be registered to the infrared code table from a storage medium connected to the input device so that a new control-subject apparatus is registered for controlling.

In a thirteenth aspect of the present invention, there is provided the terminal device according to the eleventh aspect, in which, the terminal device is connected to a printer to enable printing of a dot pattern on a paper-form medium together with graphic data.

According to this, new input device is not required when buying a new product, thereby enhancing convenience for a user.

In a fourteenth aspect of the present invention, there is provided a paper controller, in which, the paper controller is the paper-form medium according to the thirteenth aspect on which graphic data including an image, text, or symbol which represents an operation of a control-subject apparatus is superimposed and printed on the dot pattern.

According to this, an operation no longer requires pressing of operation buttons on remocon a number of times, thereby enabling easy manipulation of electric products.

In a fifteenth aspect of the present invention, there is provided a terminal device for registering a new control-subject apparatus to the input device according to any one of the first to sixth aspects so that the new control-subject apparatus can be controlled by the input device, the terminal device comprising: an image layout unit whose graphic data of an image, text, or symbol represents an operation of the control-subject apparatus, the graphic data corresponding to one or a plurality sheets of paper controllers; and a table updating unit for updating an infrared code table which relates a dot code defined for the graphic data with an infrared code, in which, the terminal device is capable of creating the paper controller on which a graphic corresponding to a control command that a user desires to use is superimposed and printed on a dot pattern.

In a sixteenth aspect of the present invention, there is provided the input device for the apparatus using the dot pattern according to the first to sixth aspects, in which, the input device incorporates the reading unit or the input device is a mobile phone terminal connected to the reading unit wiredly or wirelessly.

According to this, a paper controller may be customized and printed for a user's own use, thereby enabling a provision of a highly convenient and flexible paper controller.

In a seventeenth aspect of the present invention, there is provided the input device for the apparatus using the dot pattern according to any one of the first to sixth and twelfth, in which, the input device is connected to a control-subject apparatus over a wireless communication, optical communication, wired communication or any other communication methods, in stead of the infrared rays.

According to this, the present invention may be used in cases using a variety of communication methods without a limitation to the infrared communication.

In an eighteenth aspect of the present invention, there is provided the input device for an apparatus using a dot pattern according to any one of the first to sixth, twelfth and sixteenth aspects, in which, the input device and a control-subject apparatus are integrated into a terminal capable of receiving one-segment broadcasts.

In a nineteenth aspect of the present invention, there is provided the input device according to any one of the first to sixth, twelfth sixteenth to eighteenth aspects, in which, the dot code includes XY coordinates instead of a code or includes XY coordinates with a code.

In a twentieth aspect of the present invention, there is provided the receiver according to any one of the seventh to tenth aspects, in which, the dot code includes XY coordinates instead of a code or includes XY coordinates with a code.

In a twenty-first aspect of the present invention, there is provided the terminal device according to any one of the eleventh, thirteenth and fifteenth aspects, in which, the dot code includes XY coordinates instead of a code or includes XY coordinates with a code.

In a twenty-second aspect of the present invention, there is provided the paper controller according to the fourteenth aspect, in which, the dot code includes XY coordinates instead of a code or includes XY coordinates with a code.

According to this, a region playing a role as a tablet or a mouse pad may be provided in a paper controller, thereby enabling a provision of a more flexible controller.

In a twenty-third aspect of the present invention, there is provided a system comprising: an input device for an apparatus using a dot pattern comprising: a reading unit for reading out a dot pattern formed on a medium surface based on a predetermined rule, a converting unit for analyzing a dot pattern from image information of the dot pattern read out by the reading unit and converting the dot pattern into a dot code corresponding to the dot pattern, an infrared code table for registering one or a plurality of infrared codes related to the dot code, and a control unit for causing the infrared code read out from the infrared code table to be irradiated from an infrared emission unit to a control-subject apparatus; and a set-top box as the control-subject apparatus, in which, the set-top box receives broadcasting data, and according to input information of the input device, outputs the broadcasting data on a monitor, the set-top box is connected with a printer, and the printer converts image data relating to the broadcasting data that the control-subject apparatus outputs on the monitor into print information, also converts code information relating to the broadcasting data into a dot pattern, then superimpose and print on a medium surface.

In a twenty-fourth aspect of the present invention, there is provided the system according to the twenty-third aspect, in which, the control unit of the input device, when an infrared code corresponding to the dot code does not exist in the infrared code table, irradiates an infrared code where a manufacturer code defined for the control-subject apparatus or a predetermined specific manufacturer code is added to the read-out dot code from the infrared emission unit to the control-subject apparatus.

In a twenty-fifth aspect of the present invention, there is provided the system according to either twenty-third or twenty-fourth aspect, in which, the control-subject apparatus is connected to a network and receives information related to broadcasting data from a server that provides program information.

In a twenty-sixth aspect of the present invention, there is provided the system according to any one of twenty-third to twenty-fifth aspects, in which, the input device stores an infrared code that was transmitted to the control-subject apparatus, and when the input device is connected to a terminal device (PC) wiredly or wirelessly, the input device transmits the infrared code as user's viewing information or recording information, shopping information, in which, the terminal device is connected to a network and receives and displays, according to the viewing information or the recording information, information related to the viewing information or the recording information from a server which provides program information.

According to the present invention, one input device is made possible to control a plurality of control-subject apparatuses of a plurality of manufacturers. Therefore, since a user is not required to prepare an input device (a remote controller) for each apparatus, a highly convenient and flexible remote controller system may be provided.

Furthermore, using a paper controller eliminates a need for a complicated operation such as a user setting a remote controller by pressing the remote controller buttons multiple times to conduct a desired control, whereby a remote controller system superior in operability and affinity may be provided.

BRIEF DESCRIPTION OF THE DRAWINGS

FIGS. 7A and 7B are exemplary drawings showing arrangements of information dots in GRID1.

FIG. 8 is an example of information dots in GRID1 and bit expressions of data defined therein and shows another embodiment.

FIGS. 9A to 9C are examples of information dots in GRID1 and bit expressions of data defined therein. FIG. 9A arranges two dots, FIG. 9B arranges four dots, and FIG. 9C arranges five dots.

FIGS. 10A to 10D show modification examples of a dot pattern in GRID1. FIG. 10A is a schematic diagram where six information dots are arranged, FIG. 10B is a schematic diagram where nine information dots are arranged, FIG. 10C is a schematic diagram where 12 information dots are arranged, and FIG. 10D is a schematic diagram where 36 information dots are arranged.

FIGS. 11A and 11B are explanatory diagrams showing dot patients of direction dots.

FIGS. 13A and 13C are diagrams illustrating dot pattern formats according to the embodiment.

FIG. 17 is a diagram illustrating an infrared code table in which a plurality of infrared codes are registered in a dot code.

FIGS. 22A and 22B are diagrams illustrating updating of an infrared code table when a new product is purchased.

FIG. 37 is a diagram where a printer is connected to a television that has a function of a set-top box connected to the Internet.

DESCRIPTION OF NUMERALS AND SIGNS

DETAILED DESCRIPTION OF THE INVENTION

The present invention is described in detail below by reference to the drawings.

Figure 1:
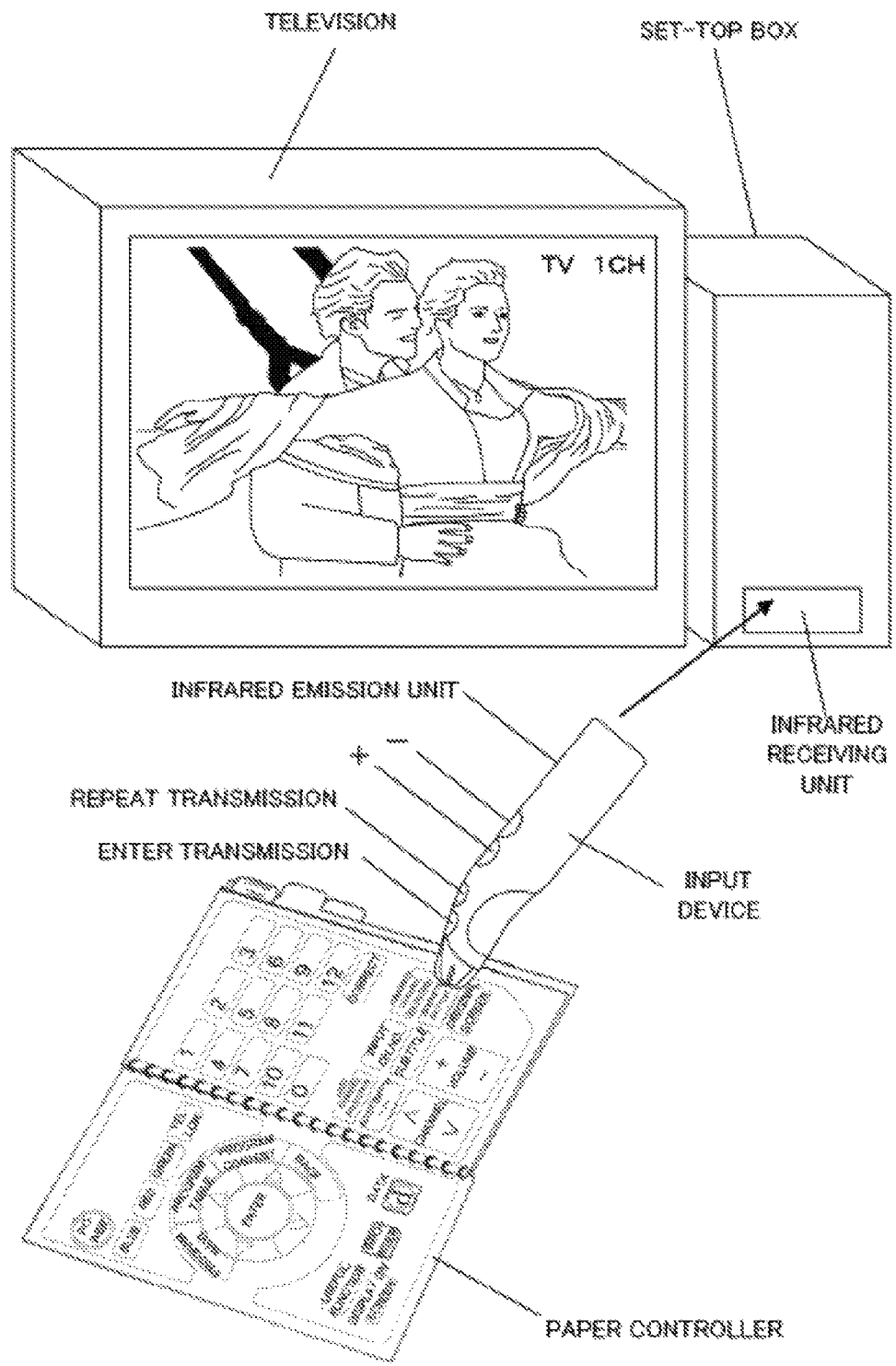
FIG. 1 is an explanatory diagram showing a use situation of a paper remocon system according to the present invention.

FIG. 1 is an explanatory diagram for illustrating a paper remocon system according to the present invention and a use situation thereof.

This system comprises a paper controller and an input device. The paper controller is of a booklet form where one of the long sides is bound with rings. Designs of operation buttons are printed on each page surface of the booklet.

Illustrative examples are shown in FIGS. 23 to 30 and 31. That is, a plurality of image regions of rounded corner rectangles or rounds, rectangles, which resemble operation buttons of remocons for a television and a set-top box, are provided, on which numbers, symbols, and words consisting of a plurality of characters (such as "Last channel selection," "Input channel number," "Enter") are printed.

An infrared code corresponding to each number or a plurality of characters is registered as a dot pattern, which is described later, in each image region.

It should be noted that a paper controller may take any form, such as one or a plurality of paper media, a picture book of a booklet shape, a magazine, or a catalogue, as shown in FIG. 1, on which an image, character, or symbol representing an operation of a control-subject apparatus is printed as graphic data.

The input device incorporates a sensor unit (reading unit) on the leading end (lower end in FIG. 1) of the device body. One side of the body is equipped with four push buttons; Enter transmission button. Repeat transmission button, + (pointer up) button, and − (pointer down) button, in the order from the closest to the leading end, are equipped. An infrared transmission unit is also equipped in a part lower than the push buttons.

The present invention is used for an operation of a set-top box, television, and the like. A user (an operator) clicks an image region of a paper controller by use of an input device. As a result, the CPU of the input device converts a dot pattern printed on the clicked image region into a dot code, reads out an infrared code corresponding to the dot code by referring to a table registered in the FM (flash memory), and transmits the read-out infrared code from the infrared emission unit to an infrared receiving unit of a set-top box (STB) or television. The set-top box or television accordingly executes the command corresponding to the received infrared code, such as showing of a television program on a relevant television channel.

Figure 2:
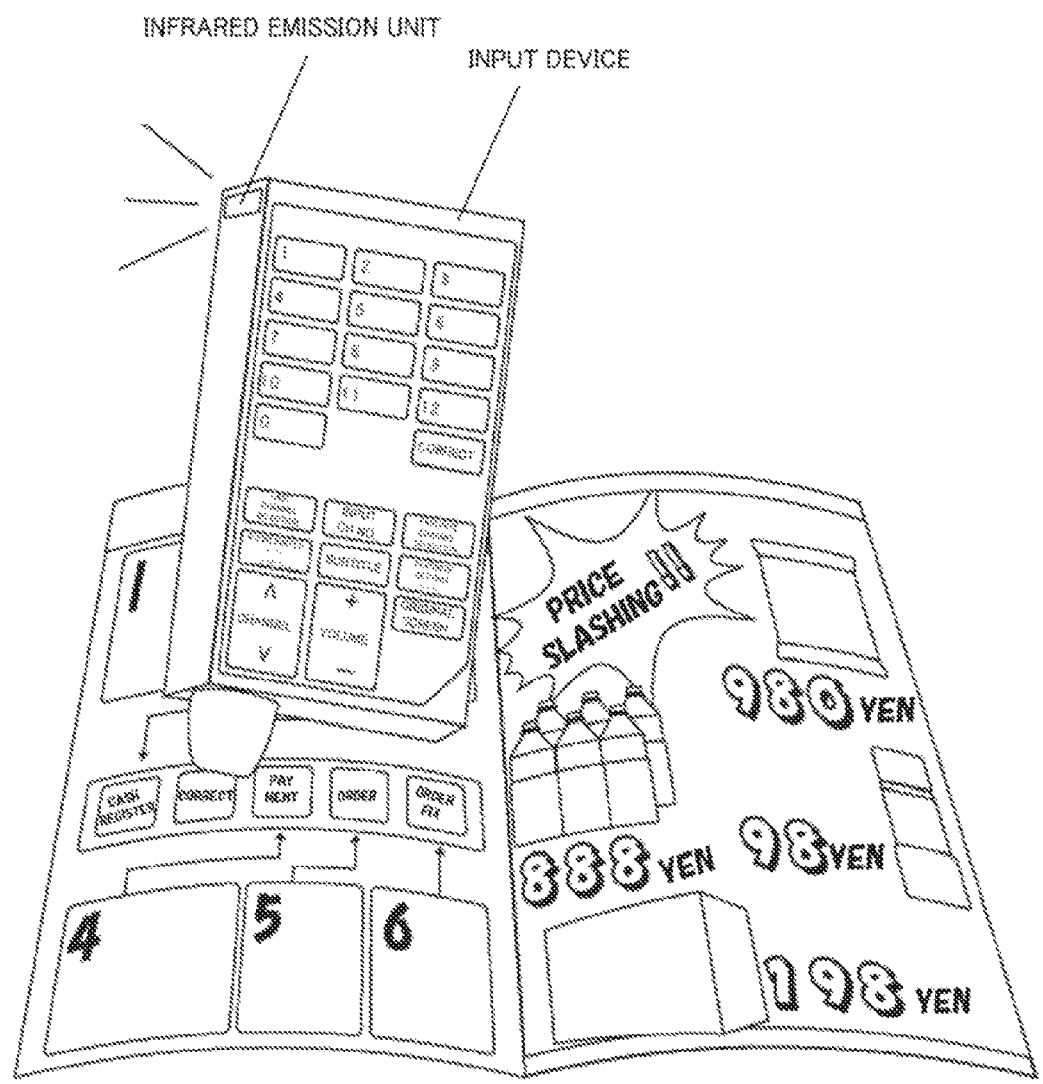
FIG. 2 is a diagram (1) showing a modification example of a paper remocon system.
Figure 3:
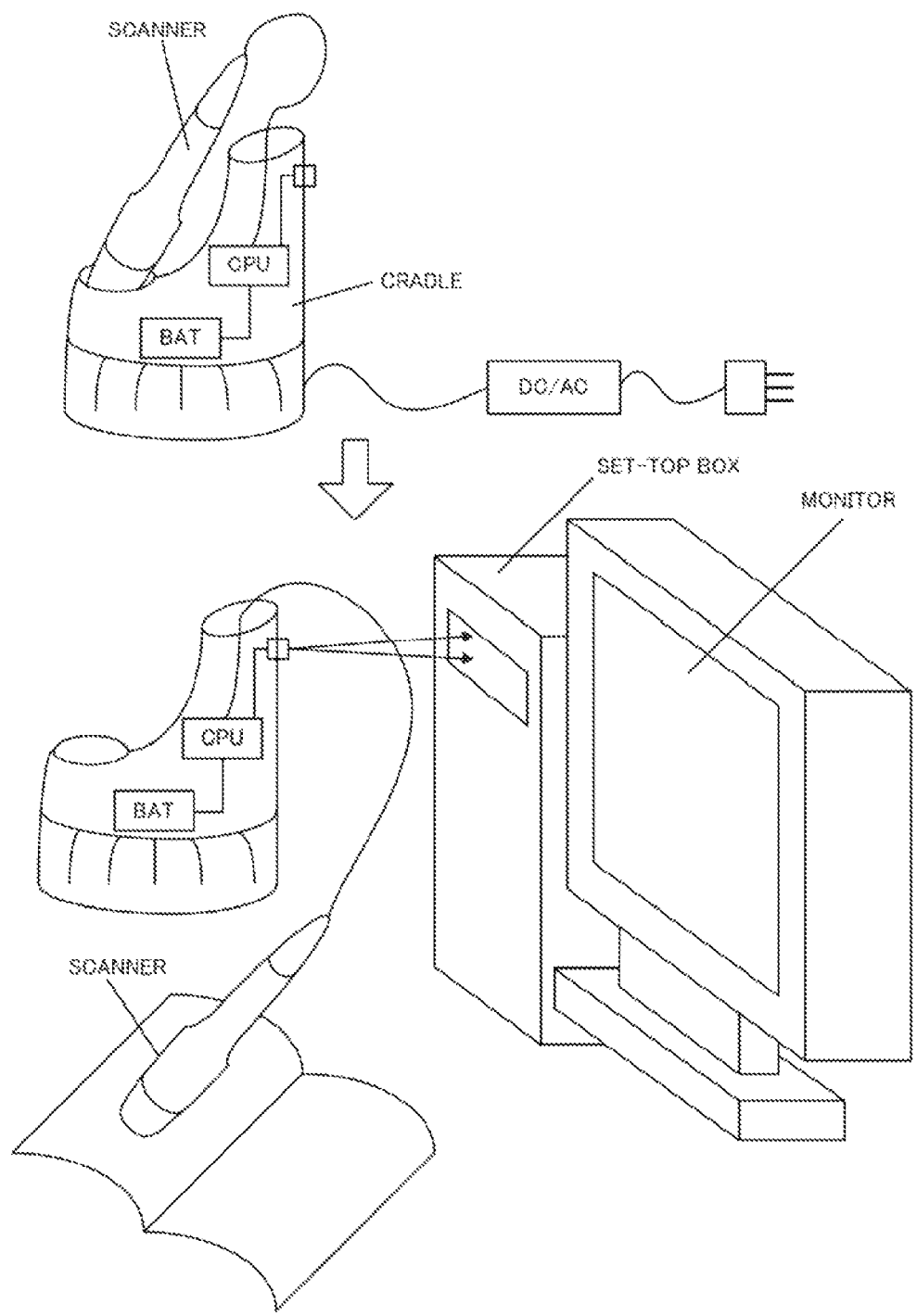
FIG. 3 is a diagram (2) showing a modification example of a paper remocon system.

FIGS. 2 and 3 are diagrams illustrating modification examples of paper remocon systems.

The input device in FIG. 2 integrates a scanner and an ordinary remocon. A scanner is mounted on the leading end of an operation panel of a remocon.

FIG. 3 is a remocon of a structure where a scanner can be placed on a cradle (a stand). As shown in FIG. 3, the cradle incorporates a Battery (BAT) and a Central Processing Unit (CPU) that analyzes a signal read out by a scanner and generates an infrared signal. That is, in this remocon system, the cradle is equipped with an infrared emission unit.

Figure 4:
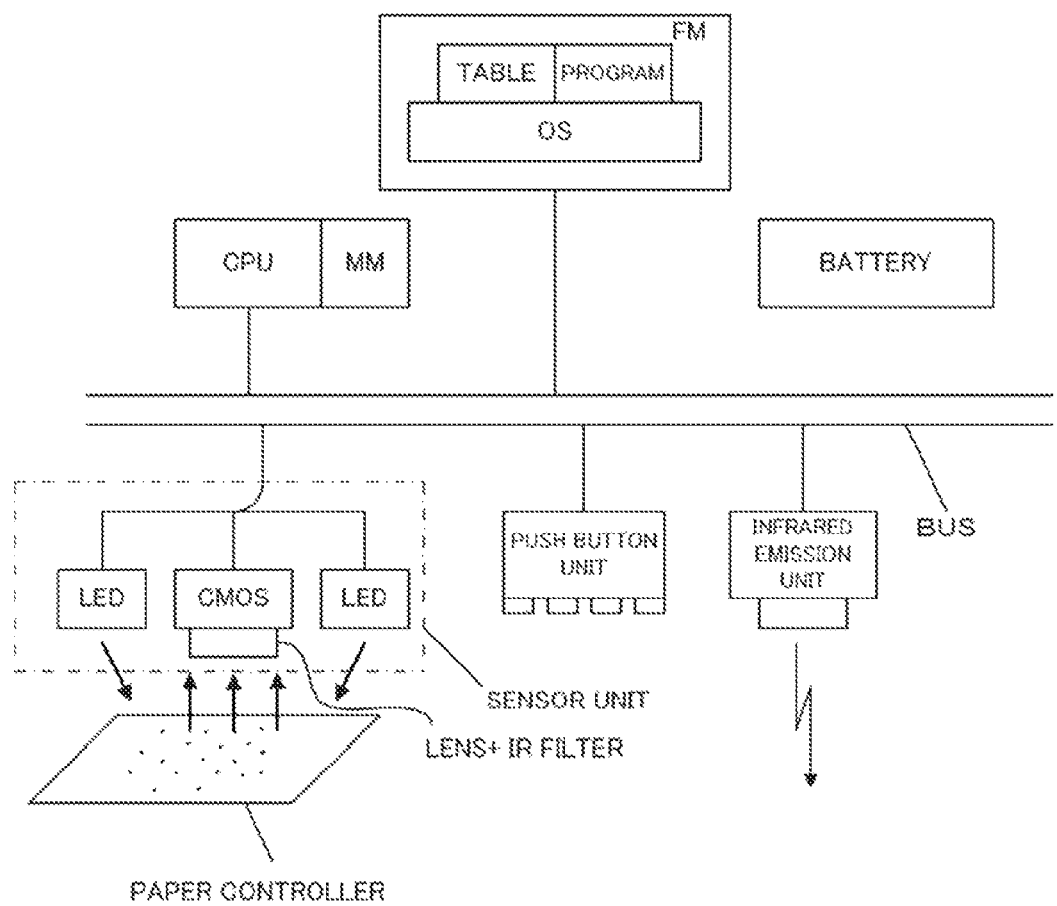
FIG. 4 is a hardware block diagram showing internal structure of an input system comprising a paper remocon system.

FIG. 4 is a hardware block diagram illustrating a structure of the input device described above.

As shown in FIG. 4, the input system comprises a Main Memory (MM), battery, Flash Memory (FM) connected through a bus, infrared emission unit, push button unit, and sensor unit (a reading unit), centering on a Central Processing Unit (CPU).

The flash memory (FM) registers a program such as a dot pattern analysis program used in this embodiment and tables such as a dot code-infrared correspondence table, as well as an Operating System (OS).

The central processing unit (CPU) sequentially reads programs in the flash memory through a bus (BUS) and the main memory (MM), then performs execution processing.

The reading unit comprises an LED that is an infrared irradiation means, lens, IR filter, and CMOS sensor that is an optical imaging element. When the LED irradiates a paper controller, the optical imaging element captures an image of reflected light of the irradiation light. Here, a dot pattern of the paper controller is printed with carbon ink; other part than the dot pattern is printed with non-carbon ink.

This carbon ink has infrared light absorbing characteristic, so an image captured by the optical imaging element shows black only on dot parts.

Here, as for the irradiation light, although this embodiment is described with a case using infrared rays and a dot pattern printed with carbon ink (an ink having an infrared absorbing characteristic), for example, ultraviolet rays and a dot pattern printed with an ink having an ultraviolet absorbing characteristic can be used without limitation.

The capture image of a dot pattern read out in this manner, is analyzed by the central processing unit (CPU) of the input device, converted into a coordinate or a code value, then transmitted via an infrared emission unit to an infrared receiving unit of a set-top box or television.

FIGS. 5 to 13C describe such a dot pattern.

Description of a Dot Pattern GRID1

FIGS. 5 to 10D are explanatory diagrams showing GRID1 that is an example of a dot pattern of the present invention.

It should be noted that, in these diagrams, grid lines in horizontal and vertical directions are added for convenience of description, and do not exist in an actual printing surface. If a scanner as an imaging unit has an infrared irradiation means, a key dot 2, an information dot 3, a reference grid point dot 4 and the like constituting a dot pattern 1, are preferably printed with an invisible ink or a carbon ink, which absorbs the infrared light.

Figure 5:
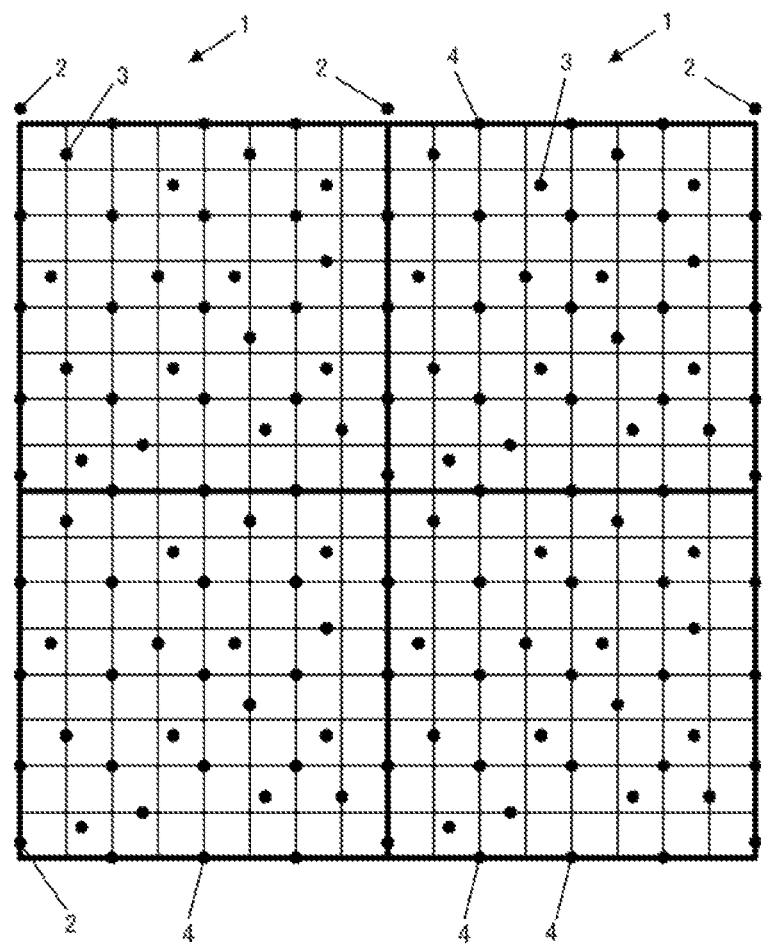
FIG. 5 is an explanatory diagram showing a dot pattern of GRID1.
Figure 6A:
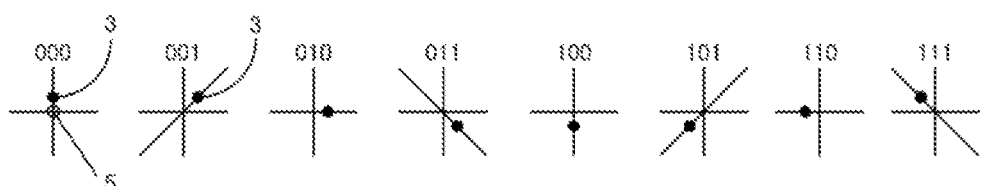
FIG. 6 is an enlarged diagram showing an example of information dots of a dot pattern in GRID1.
Figure 6B:
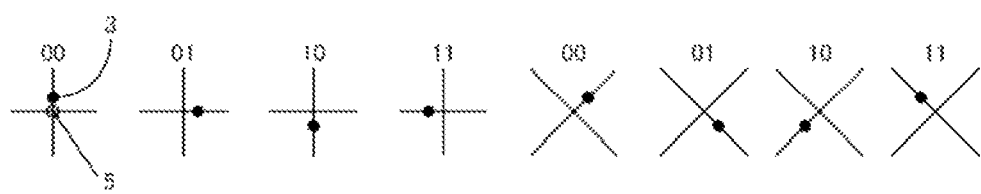

FIG. 5 is an enlarged diagram showing an example of information dots of a dot pattern and bit expression of data defined therein. FIGS. 6A and 6B are explanatory diagrams showing information dots arranged with key dots located in the centers.

The information input and output method using a dot pattern of the present invention comprises means for generating a dot pattern 1, means for recognizing the dot pattern 1, and means for outputting information and a program from the dot pattern 1. That is, after retrieving a dot pattern 1 as image data with a camera, first, the method extracts a reference grid point dot 4, then, extracts a key dot 2 based on the fact that there is no dot at the location where a reference grid point dot 4 supposed to be, extracts an information dot 3, digitizes the information dot 3 to extract an information region, converts the information into numerical values, and outputs information and a program from this dot pattern 1 based on the numerical information. For example. the method outputs information such as a sound and a program from this dot pattern t to an information output device, a personal computer, a PDA, a mobile phone, or the like.

To generate a dot pattern 1 of the present invention, based on a dot code generation algorithm, fine dots, used for recognition of information such as a sound, including key dots 2, information dots 3, and reference grid point dots 4, are arranged in accordance with a predetermined rule. As shown in FIG. 5, in a block of a dot pattern 1 which represents information, 5×5 reference grid point dots 4 are arranged with reference to a key dot 2, and an information dot 3 is arranged around a virtual grid point 5 which is at the center surrounded by the four reference grid point dots 4. Arbitrary numerical information is defined in this block. The illustrative example of FIG. 5 shows a case where 4 blocks of a dot pattern 1 are arranged in parallel (in bold frame), provided, however, that the dot pattern 1 is not limited to four blocks.

One piece of information and program corresponding to a block can be output, or one piece of information and program corresponding to a plurality of blocks can be output.

When a camera retrieves this dot pattern 1 as image data, reference grid point dots 4 can calibrate a distortion of a lens of the camera, skewed imaging, expansion and contraction of a paper surface, and distortion during printing. Specifically, a function for calibration (Xn, Yn)=(Xn', Yn') is calculated for converting distorted four reference grid points 4 into the original square, then the vector of the correct information dot 3 is calculated by calibrating an information dot 3 by the same function.

If reference grid point dots 4 are arranged in a dot pattern 1, since image data of the dot pattern 1 retrieved by a camera can be calibrated its distortion attributable to the camera, image data of the dot pattern 1 can be accurately recognized even when the image data is retrieved by a popular camera with a lens of high distortion rate. Moreover, even when the dot pattern 1 is read out by a camera inclined with reference to a surface of the dot pattern 1, the dot pattern can be accurately recognized.

Key dots 2 are dots, as shown in FIG. 5, arranged by shifting four reference grid point dots 4 that are located at the four corners of a block, in a certain direction. The key dot 2 is a representative point of a block of a dot pattern I which represents an information dot 3. For example, the key dots are dots obtained by shifting reference grid point dots 4 that are located at the four corners of a block of a dot pattern 1 by 0.1 mm upward. If an information dot 3 represents XY coordinates, coordinate point is at the position obtained by shifting key dot 2 by 0.1 mm downward. However these numbers are not limited to these, and may vary depending on the size of a block of a dot pattern 1.

Information dots 3 are dots used for recognition of a variety of information. The information dot 3 is arranged around a key dot 2 as a representative point, as well as at the ending point of a vector expressed with a starting point being a virtual grid point 5 that is at the center surrounded by four reference grid point dots 4. For example, the information dot 3 is surrounded by reference grid point dots 4 and, as shown in FIG. 6A, since the dot 0.1 mm apart from the reference grid point 5 has direction and length when expressed as a vector, the information dots 3 expresses 3 bits by being disposed in eight directions by being rotated by 45 degrees each in clockwise direction. As a result, one block of a dot pattern I can express 3 bits×16=48 bits.

FIG. 6B is a method for defining an information dot 3 having 2 bits for each grid, in a dot pattern of FIG. 5. Each grid defines information of 2 bits by shifting a dot in + direction and × direction. In this way, although 48 bits information can be defined indeed, data can be allocated to each 32 bits by dividing for an intended purpose. Maximum of $2^{16}$ (approximately 65,000) patterns of dot pattern formats can be realized depending on the combination of + direction and × direction.

It should be noted that arrangement is not limited to this and may vary including a possibility of 4 bit expression by arranging dots in 16 directions.

Preferably, the dot diameter of a key dot 2, information dot 3, or reference grid point dot 4 is approximately 0.05 mm in consideration of viewing quality, printing accuracy in respect of a paper property, resolution of a camera, and optimal digitization.

Also, the gap between reference grid point dots 4 is preferably approximately 0.5 mm in both vertical and horizontal directions in consideration of information amount required for an imaging area and possible false recognition of dots 2, 3, and 4. In consideration of false recognition of reference grid point dots 4 and information dots 3, disalignment of a key dot 2 is preferably around 20% of the grid gap.

The gap between the information dot 3 and a virtual grid point that is surrounded by four reference grid point dots 4 is preferably the gap approximately 15 to 30% of a distance between adjacent virtual grid points 5. If the distance between an information dot 3 and a virtual grid point 5 is shorter than this gap, dots are easily recognized as a big cluster, degrading the visual quality as a dot pattern 1. On the other hand, if the distance between an information dot 3 and a virtual grid point 5 is longer than this gap, the judgment as to which one of the adjacent virtual grid point 5 is the center of a vector of the information dot 3 becomes difficult.

For example, as shown in FIG. 7A, when arranging from the center of a block from $I_1$ to $I_{16}$ in clockwise direction and the grid gap is 0.5 mm, the information dots 3 express 2 bits×16=32 bits in 2 mm×2 mm.

Further, a block can include sub-blocks which have independent information content and are not affected by other information content. FIG. 7B illustrates such sub blocks. The sub blocks each composed of four information dots 3 [$I_1$, $I_2$, $I_3$, $I_4$], [$I_5$, $I_6$, $I_7$, $I_8$], [$I_9$, $I_{10}$, $I_{11}$, $I_{12}$], [$I_{13}$, $I_{14}$, $I_{15}$, $I_{16}$] deploy independent data (3 bits×4=12 bits) in information dots 3. In this way, having sub-blocks makes error checks easier as the error checks are to be done for each sub-block.

Vector direction (rotation direction) of information dots 3 is preferably set evenly for each 30 to 90 degrees.

FIG. 8 is an example of information dot 3 and bit expression of data defined therein, showing another embodiment.

Information dots 3 can express 4 bits if two types of information dots, long and short distance ones from a virtual grid point 5 that is surrounded by reference grid point dots 4, are used, and vector directions are eight directions. Here, the long distance of the information dots 3 is preferably approximately 25 to 30% of the distance between adjacent virtual grid points 5, and the short distance, approximately 15 to 20%. However, the gap between the centers of the long and short distance information dots 3 is preferably longer than the diameters of these dots.

The information dot 3 surrounded by four reference grid point dots 4 is preferably one dot in consideration of visual quality. However, if the visual quality is disregarded and information amount is required to he large, one bit can be allocated to each vector and information dot 3 can be expressed by a plurality of dots thereby expressing a great amount of information. For example, with vectors of 8 concentric directions, an information dot 3 surrounded by four grid dots 4 can express $2^8$ pieces of information, 16 information dots in one block accounts for $2^{128}$ pieces of information.

FIGS. 9A to 9C are examples of information dots and bit expressions of data defined therein. FIG. 9A is a diagram disposing two dots; FIG. 9B is a diagram disposing four dots; and FIG. 9C is a diagram disposing five dots.

FIGS. 10A to 10D show modification examples of a dot pattern. FIG. 10A is a schematic diagram of six information dot arrangement; FIG. 10B is a schematic diagram of nine information dot arrangement; FIG. 10C is a schematic diagram of 12 information dot arrangement; and FIG. 10D is a schematic diagram of 36 information dot arrangement.

The dot pattern 1 shown in FIGS. 5, 7A and 7B shows examples where 16 (4×4) information dots 3 are arranged in one block. However, this information dot 3 is not limited to disposing of 16 dots and may vary. For example, depending on the required information size and the resolution of a camera, 6 (2×3) information dots 3 may be arranged in one block (FIG. 7A), 9 (3×3) information dots 3 may be arranged in one block (FIG. 7B), 12 (3×4) information dots 3 may be arranged in one block (FIG. 7C), and 36 information dots 3 may be arranged in one block (FIG. 7D).

Description of a Dot Pattern; Direction Dot

Next, another embodiment of a dot pattern, a direction dot, is described with reference to FIGS. 11A and 11B.

This dot pattern defines the dot pattern's direction by the shape of its block. In FIG. 11A, reference points 48a to 48e are first arranged, and the line which connects these reference points 48a to 48e defines a shape showing the direction of the block (a pentagon oriented upward in this example). Based on these reference points, virtual reference points 48f, 48g, and 48h are arranged. An information dot 3 is disposed at the ending point of a vector which has a length and a direction when having the virtual reference point as the starting point. In this way, the direction of a block can be defined by how reference points are arranged, in FIG. 11A. In addition, when the direction of a block is defined, the whole size of the block is also defined.

It should be noted that although the reference points 48a to 48e and information dot 3 were described as being the same shapes in FIG. 11A, reference points 48a to 48e may be larger than an information dot 3. Further, these reference points 48a to 48e may take any shapes including an triangle, a square, or other polygons, as long as they can be distinguished from an information dot 3.

It should be noted that FIG. 11B is a diagram where two of the block shown in FIG. 11A are connected in horizontal direction and two in vertical direction.

Figure 12:
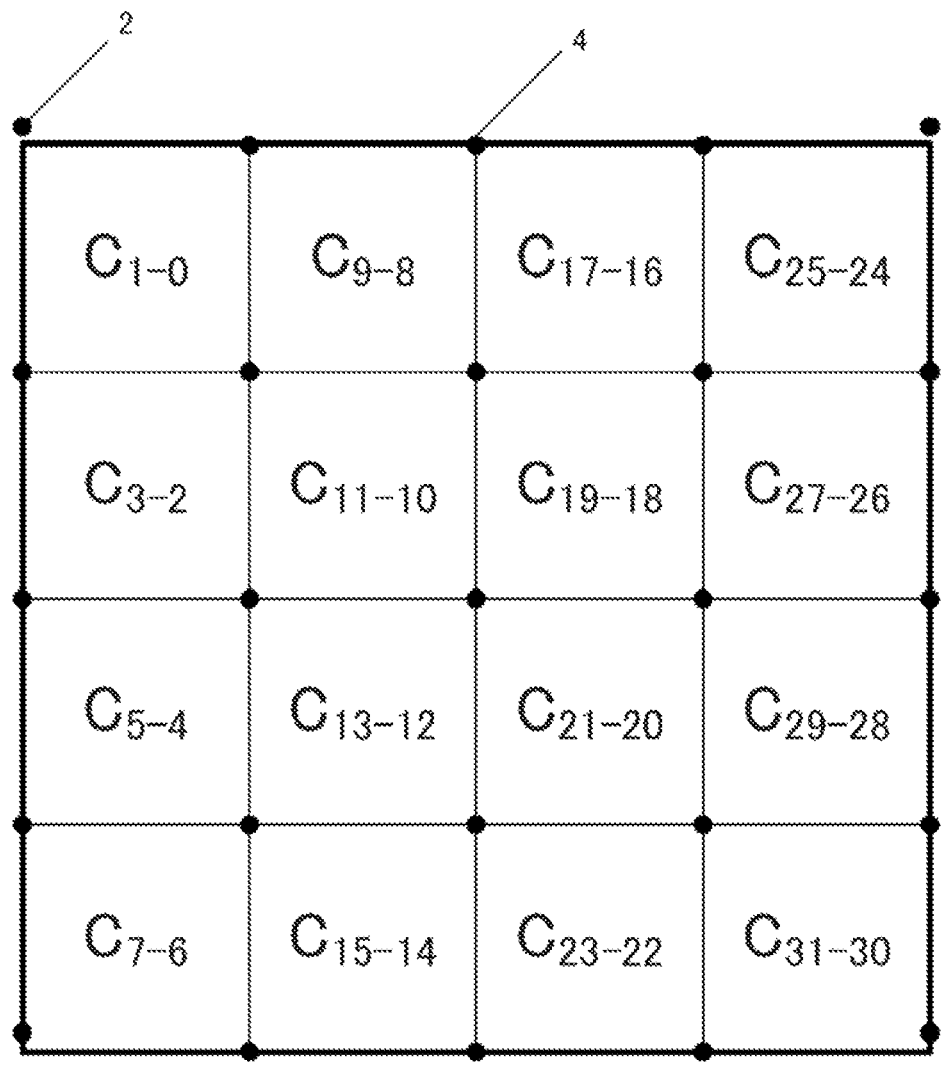
FIG. 12 is a diagram illustrating segments of information dots in GRID1.

FIGS. 12 to 13C are exemplary diagrams showing a relationship among a dot pattern, code value, and identifier.

In these Figures, although description is made using a dot pattern of GRID1 which was mentioned above, the present invention allows use of direction dot described above or other dot patterns.

As shown in FIG. 12, the dot pattern is a dot pattern composed of 4×4 block regions; the block is divided into $C_{1\text{-}0}$ to $C_{31\text{-}30}$. FIGS. 13A to 13C show dot code formats of each region.

FIG. 13A is a case where a dot pattern consists of only code values, showing a format used for an image region of a paper controller. $C_0$ to $C_{25}$ register an operation instruction code instructing an operation to a control-subject apparatus; $C_{26}$ to $C_{29}$ register a manufacturer code indicating a manufacturer name; and $C_{30}$ to $C_{31}$ register parity.

In FIG. 13B, XY coordinates as well as code values are registered. That is, in FIG. 12, $C_0$ to $C_7$, $C_8$ to $C_{15}$, $C_{16}$ to $C_{25}$, and $C_{26}$ to $C_{29}$ register X coordinate, Y coordinate, an operation instruction code, and a manufacturer code, respectively.

In this way, this embodiment allows registering of XY coordinates as well as code values in a dot pattern.

FIG. 13C is a format registering only XY coordinates. That is, $C_0$ to $C_{14}$ and $C_{15}$ to $C_{29}$ register X coordinate and Y coordinate, respectively. As such, registering only XY coordinates is for a purpose for detecting a location and conducting a predetermined process as in when using for a tablet or mouse pad.

As described above, the dot pattern of the present invention can take flexible formats such as a format for registering code values only, registering code values and XY coordinates, and registering XY coordinates only.

Figure 14:
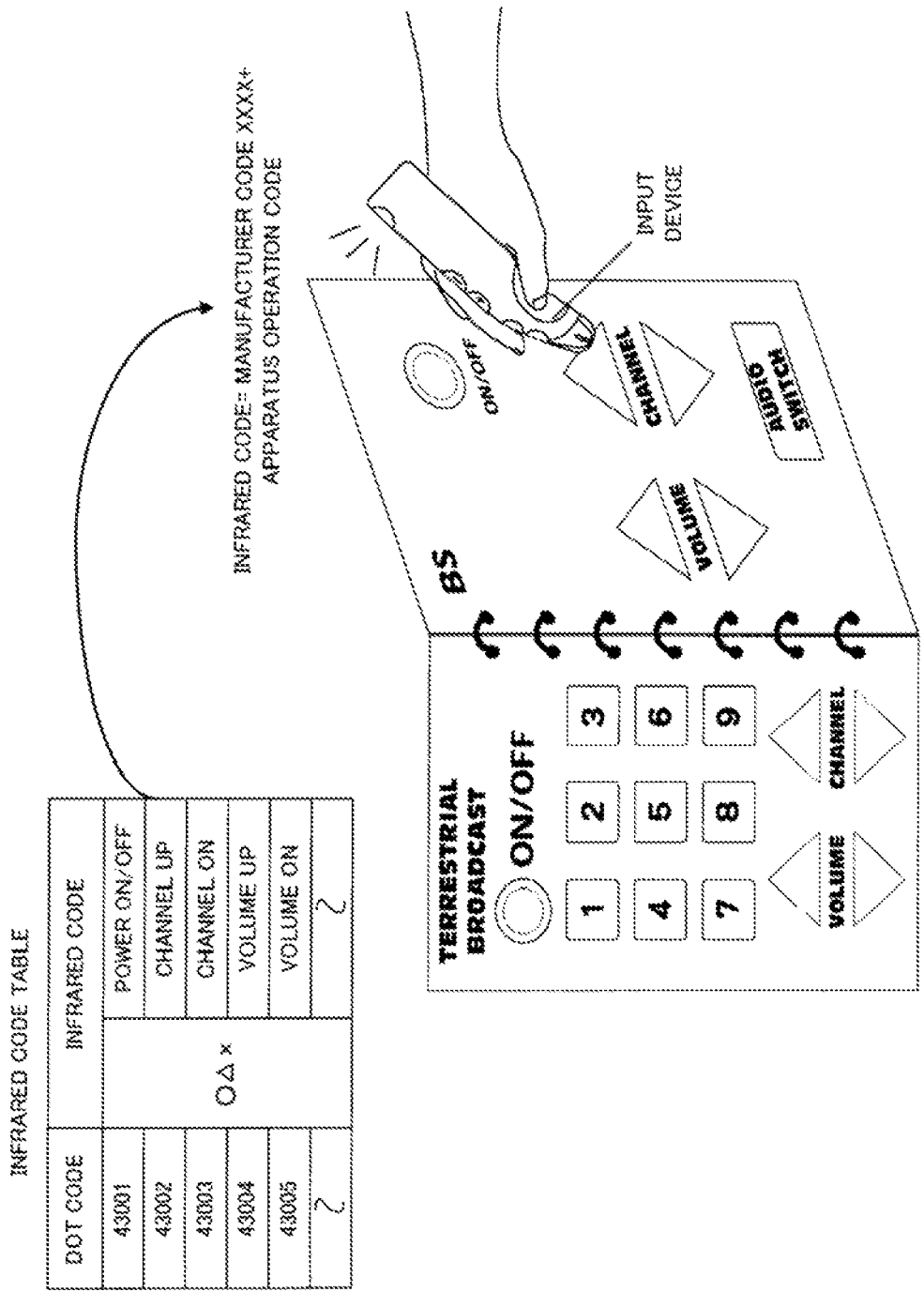
FIG. 14 is a diagram illustrating an infrared code table and user operation.

FIG. 14 is a diagram illustrating an infrared code table and user operation.

When a user clicks a paper controller using the input device, the CPU inside the input device converts a dot pattern printed on the clicked image region into a dot code. Next, the CPU refers to an infrared code table registered in the FM (flash memory).

An infrared code table is a table that indicates a correspondence between a dot code and an infrared code. An infrared code includes a manufacturer code that signifies a manufacturer name of a control-subject apparatus such as a Set-Top Box (STB) or television and an instruction code that instructs an operation of the apparatus. For example, if the read-out code is 43004, then a manufacturer name is xxxx; an operation is volume up.

The CPU reads out an infrared code corresponding to a dot code from an infrared code table, and transmits the read-out infrared code from an infrared emission unit toward an infrared receiving unit of a set-top box (STB) or television. The set-top box or television performs an operation corresponding to the received infrared code, for example, lowering a television volume.

Figure 15:
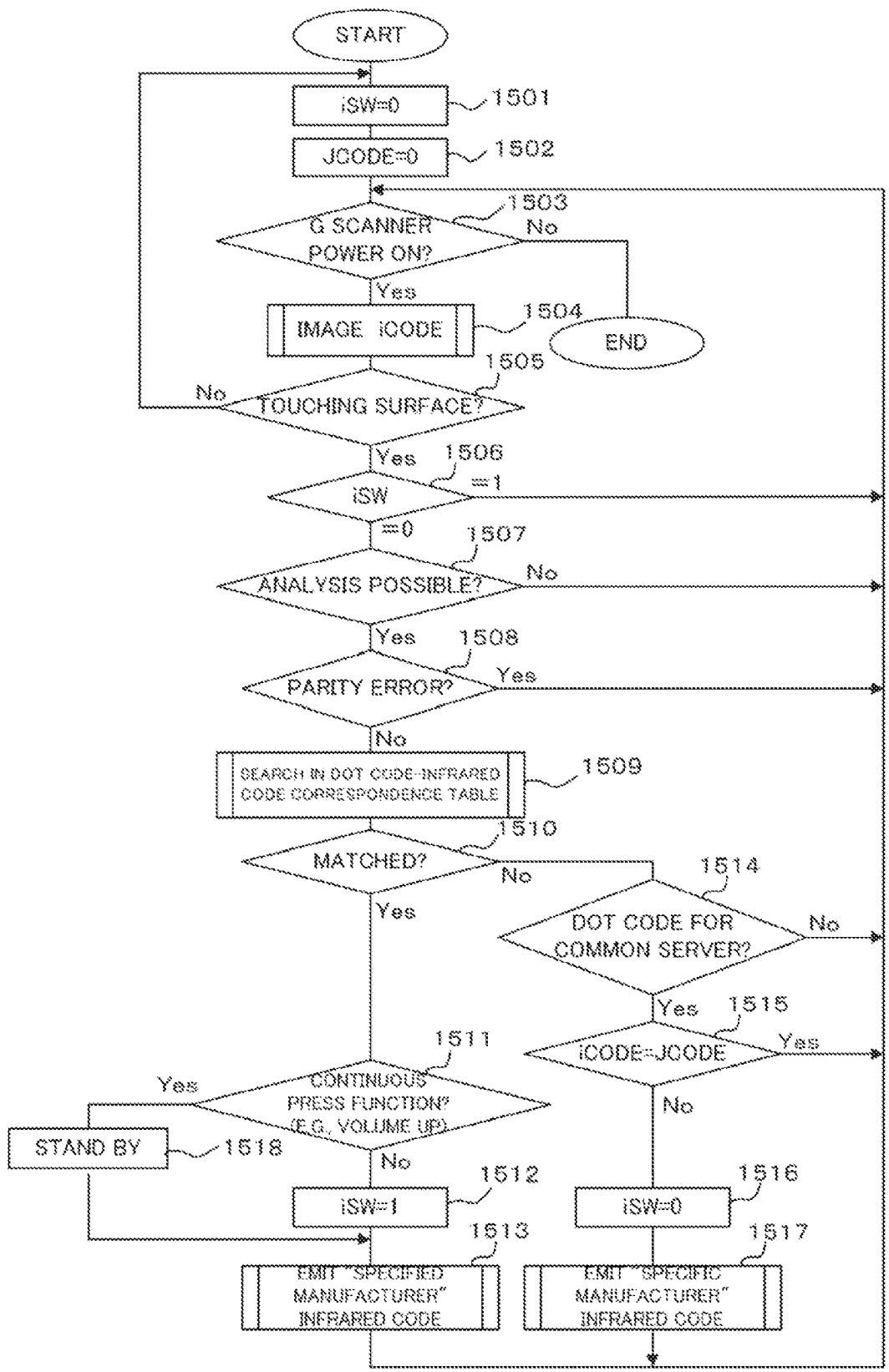
FIG. 15 is a flow chart showing processes for emitting an infrared code.

FIG. 15 is a flow chart of a process for emitting an infrared code in the remocon system of the present invention.

If a switch of the input device is not pressed (iSW=0) (1501), the code that was read last time is 0 (JCODE=0) (1502). The CPU of the input device determines whether the power for the input device is ON or not (1503). If the power is ON, iCODE is imaged (1504); if not, the process terminates. After imaging iCODE, the CPU determines whether the leading end of the input device touches on a surface of a paper controller or not (1505). If the CPU does not determine the input device touches the paper controller surface, the CPU performs the process of step 1501 again. If the CPU determines that the input device touches the surface, it determines whether a switch is pressed (iSW=1) or not pressed (iSW=0). If the CPU determines that iSW=1, it performs the process from step 1503 again. If the CPU determines iSW=0, it determines if a dot code can be analyzed or not (1507). If the CPU does not determine as analyzed, it performs the process from step 1503 again, and if the CPU determines as analyzed, it determines whether parity error exists or not. If parity error is determined, the CPU performs the process from step 1503 again. If parity error is not determined, the CPU searches the dot code-infrared code correspondence table (1509) and determines whether a dot code and infrared code match or not (1510). If determined as matched, the CPU determines whether the infrared code is a continuous pressing function such as volume up or not (1511). It should be noted that if matched is determined, the dot code is highly likely correct. If the CPU does not determine the infrared code as a continuous pressing function, the CPU determines iSW=1 (1512) and emits an infrared code of a specified manufacturer from the infrared emission unit (1513), then the CPU repeats the process from step 1503. If the infrared code is determined as a continuous pressing function, the CPU stands by (1518). This standing-by is for waiting till a change happens during an arbitrary period. iSW remains as 0 and next imaging and analysis are carried out. An infrared code of a specified manufacturer is emitted from an infrared emission unit (1513), and the CPU repeats the process from step 1503, if the CPU does not determine as matched in the process of step 1510, it determines whether the infrared code is a dot code for a common server or not (1514). If the CPU determines as the infrared code as a dot code for a common server, it determines whether the code that the CPU read out last time (JCODE) and the code that the CPU read out this time (iCODE) are equal or not (1515). If the CPU does not determine that JCODE and iCODE are equal, iSW remains as 0 (1516), and the CPU emits an infrared code of a specific manufacturer code from an infrared emission unit (1517), then repeats the process from step 1503.

Figure 16:
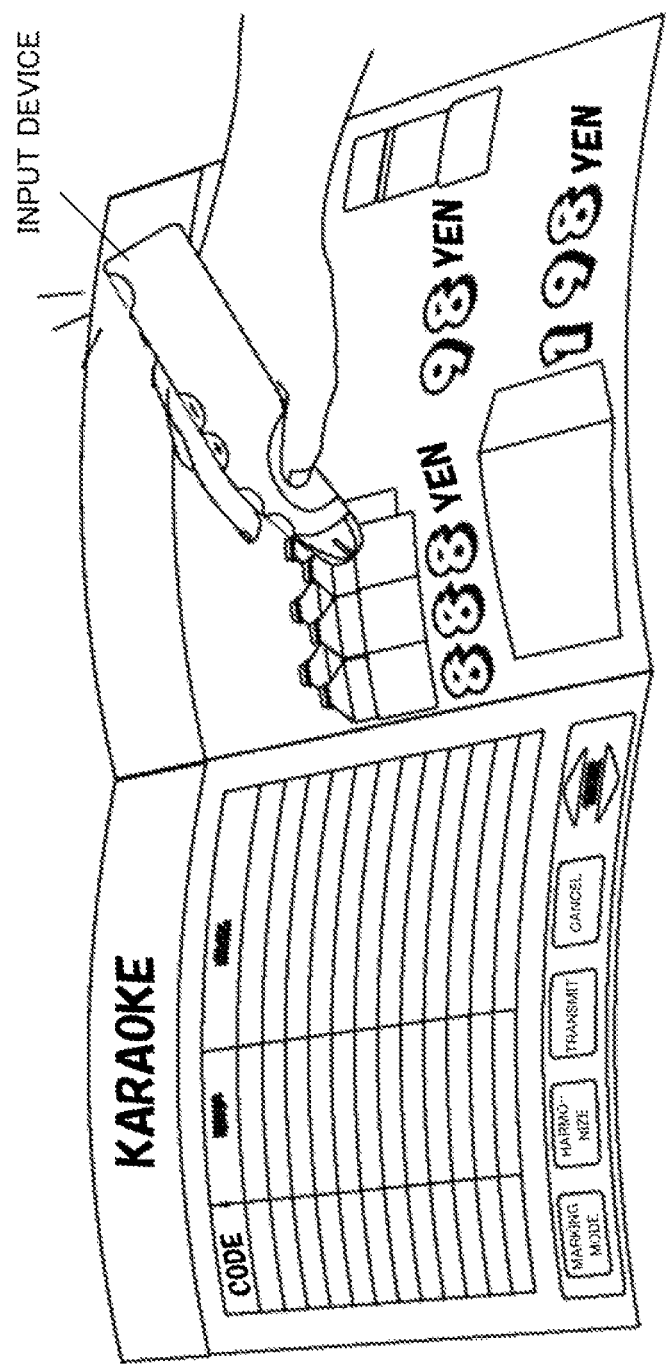
FIG. 16 is a diagram illustrating a situation in which this system is used for karaoke and mail order.

FIG. 16 is a diagram illustrating an application example of the paper remocon system described above.

In FIG. 16, a booklet featuring a mail order catalogue and karaoke songs is used as a paper controller. Dot patterns are superimposed and printed on image regions of catalogue products and karaoke songs. When a user clicks an image of a product, the CPU in the input device converts a dot pattern printed on the clicked image region into a dot code. Then, the CPU refers to an infrared code table registered in the FM (flash memory).

The infrared code table is a table that shows a correspondence of a dot code and an infrared code. The infrared code includes a manufacturer code that signifies an manufacturer name of a control-subject apparatus such as a set-top box (STB) or a television and a product code that signifies product content and the like.

The CPU reads out an infrared code corresponding to a dot code from an infrared code table, then transmits the read-out infrared code from an infrared emission unit to an infrared receiving unit of a set-top box (STB) or a television. The set-top box or television displays product information of the product corresponding to the received infrared code, such as a product image or product price, on the monitor.

The system of the present invention can be used for a variety of content, other than for mail order and karaoke, including a free magazine, reserving, recording, and replaying of broadband content, and a game.

FIG. 17 is a table showing another embodiment of an infrared code table.

The table is characterized by a case where a plurality of infrared codes are related to a dot code. For example, dot code 43103 is related to two apparatus-operation codes: terrestrial broadcast A and channel 2.

The CPU (a control unit) of the input device controls the infrared emission unit to irradiate the plurality of infrared codes continuously, or in a certain interval to an infrared receiving unit of a control-subject apparatus (e.g., a set-top box or a television).

Using such a table enables a plurality of operations performed with a click of a paper controller by a user, and can make the paper controller have a function as a programmable remocon. This enhances convenience and operability for a user.

Figures 18A, 18B:
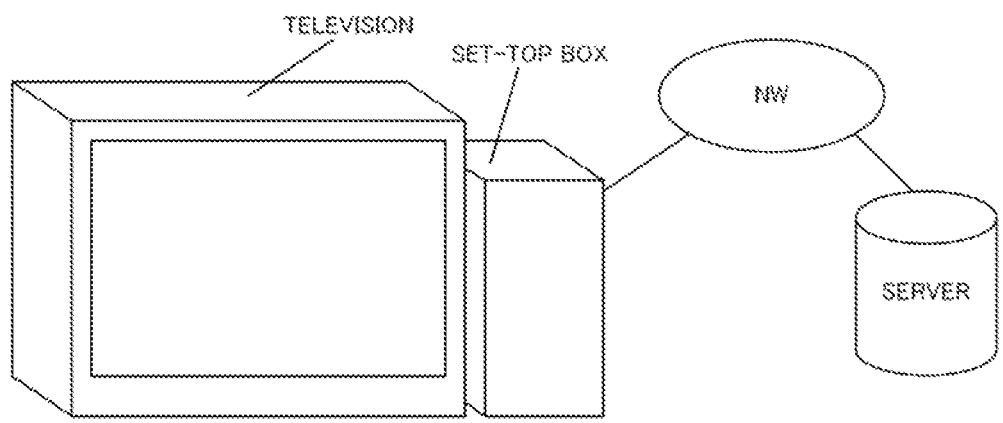
FIGS. 18A and 18B are diagrams illustrating a relationship between a set-top box and a server, and a dot code-operation table.

FIGS. 18A and 18B are diagrams illustrating a process when a read-out infrared code does not exist in the infrared code table.

As shown in FIG. 18A, the set-top box is connected to a server through a network (NW). The server can be a manufacturer server or a common server. A manufacturer server is a server that each manufacturer of a control-subject apparatus uniquely owns. A common server is a server that a specific manufacturer different from the manufacturer of a control-subject apparatus owns, and can be used by any manufacturers without limitation to the manufacturer of the control-subject apparatus.

If the dot code read out by the input device does not exist in the infrared code table in the Flash Memory of the input device, the CPU adds the read-out dot code to a manufacturer code or a specific manufacturer code to make an infrared code and transmits the infrared code from the infrared emission unit to the infrared receiving unit of a set-top box. In this case, the dot code is transmitted as is.

Here, a manufacturer code is a code indicating a manufacturer name of a control-subject apparatus, and a specific manufacturer code is a code indicating a manufacturer name of a common server.

Figure 20A:
FIGS. 20A and 20B are diagrams illustrating dot code formats in an embodiment in FIGS. 18A and 18B.
Figure 20B:

FIGS. 20A and 20B show the dot code formats of these cases.

If a dot code transmission command code is included in a dot code obtained from a dot pattern that is read out by a reading unit, the control unit emits an infrared code where the read-out dot code is added to a manufacturer code from the infrared emission unit to a control-subject apparatus.

Likely, if a specific manufacturer code signifying a specific manufacturer name is included in a dot code obtained from a dot pattern that is read out by a reading unit, the control unit emits an infrared code where the read-out dot code is added to a specific manufacturer code to from the infrared emission unit to a control-subject apparatus.

When the set-top box receives an infrared code and reads out a manufacturer code or a specific manufacturer code from the infrared code, it refers to a dot code-operation table shown in FIG. 18B. Then, if an operation corresponding to the added dot code exists, the set-top box causes a television (a control-subject apparatus) to perform the operation.

Specifically, if the added dot code is 43201, then the CPU of a set-top box instructs a television to display today's news.

If a dot code received as an infrared code does not exist in the table of FIG. 18B, or if an instruction to access a server (a manufacturer server or a common server) is included in the dot code, the set-top box accesses the server through a network and transmits the dot code. The server, after referring to a table in the server and searching a process corresponding to a transmitted dot code, instructs the set-top box to perform the process.

When the set-top box accesses a manufacturer server, the manufacturer server may be a server of a manufacturer or a server that was specified by a manufacturer. When accessing a server specified by a manufacturer, the dot code contains an index indicating a URL of the server.

Further, if accessing a common server, the set-top box may further access another server through the common server.

It should be noted that, in this embodiment, if the set-top box receives a dot code that is added a specific manufacturer code, the set-top box may access a common server through a network, whether a dot code-operation table exists, transmit the read-out dot code, and follow a process and instruction given from the common server.

Figure 19:
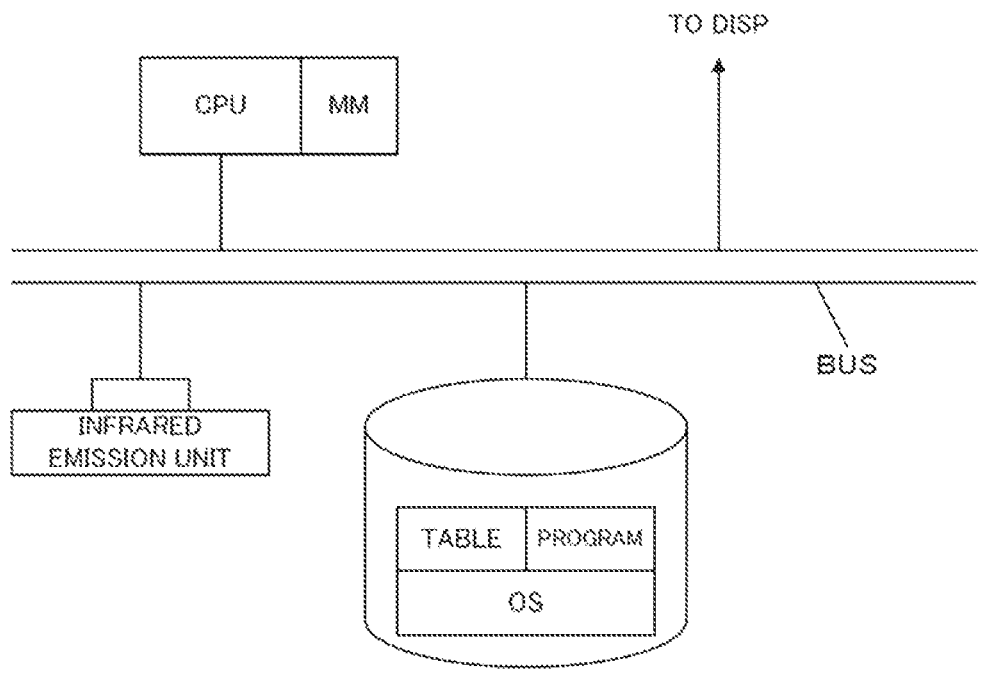
FIG. 19 is a hardware block diagram showing an internal structure of a set-top box.

FIG. 19 is a hardware block diagram indicating a structure of a set-top box described above.

As shown in FIG. 19, the set-top box comprises a main memory (MM), flash memory (FM) connected through a bus, and an infrared receiving unit, centering on a central processing unit (CPU).

The flash memory (FM) registers, as well as an operation system (OS), programs of contents, and tables such as an operation table to which an operation instruction code for a control-subject apparatus is registered.

The central processing unit (CPU) sequentially reads programs in the flash memory through the bus (BUS) and main memory (MM) and performs an execution process.

The infrared receiving unit receives an infrared code transmitted from the input device. The CPU transmits an operation instruction so that the received infrared code is analyzed and the operation instruction signified by the infrared code is displayed on a display (DISP) of a television.

Figure 21:
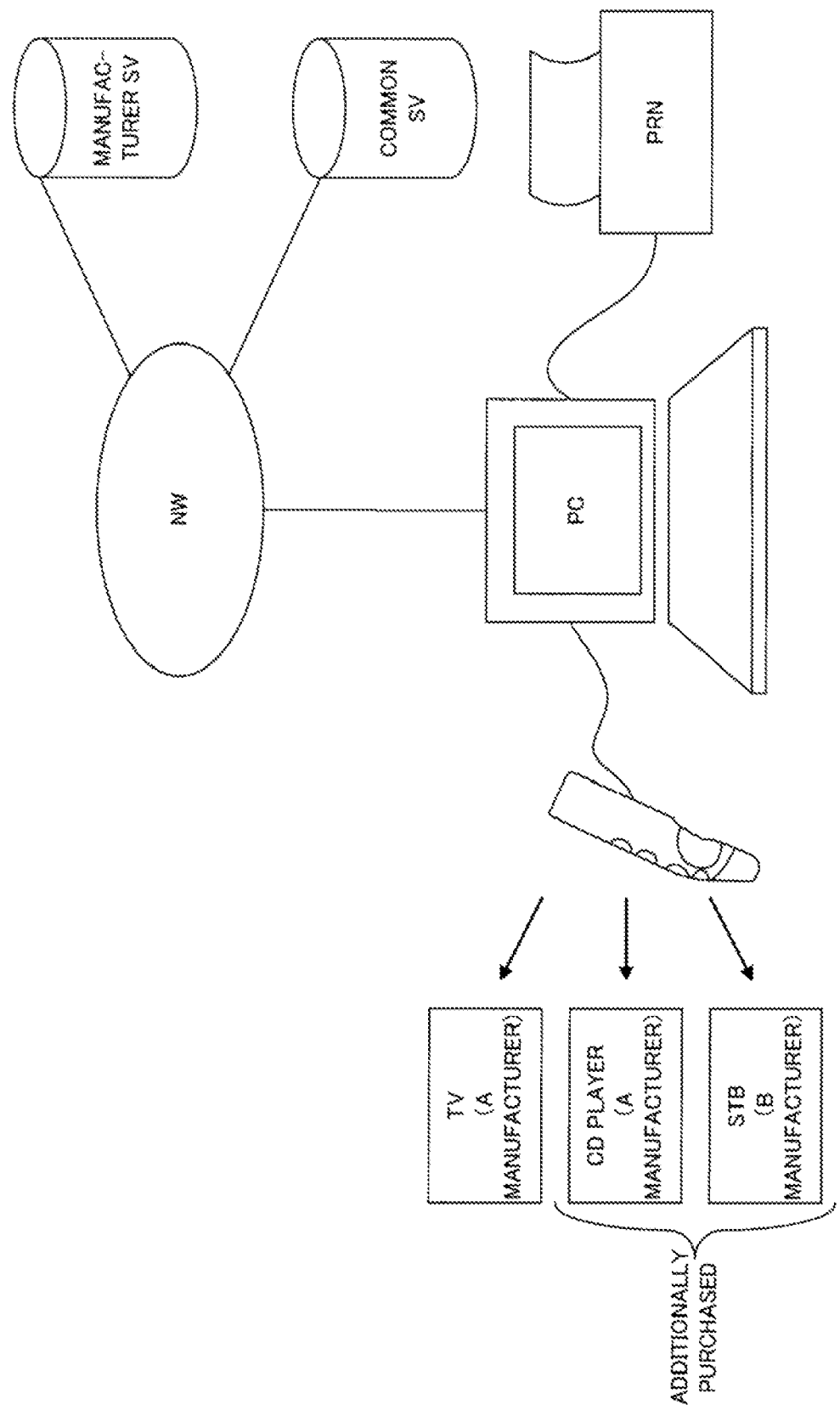
FIG. 21 is a diagram illustrating a default remocon system when a new product is purchased.
Figure 23:
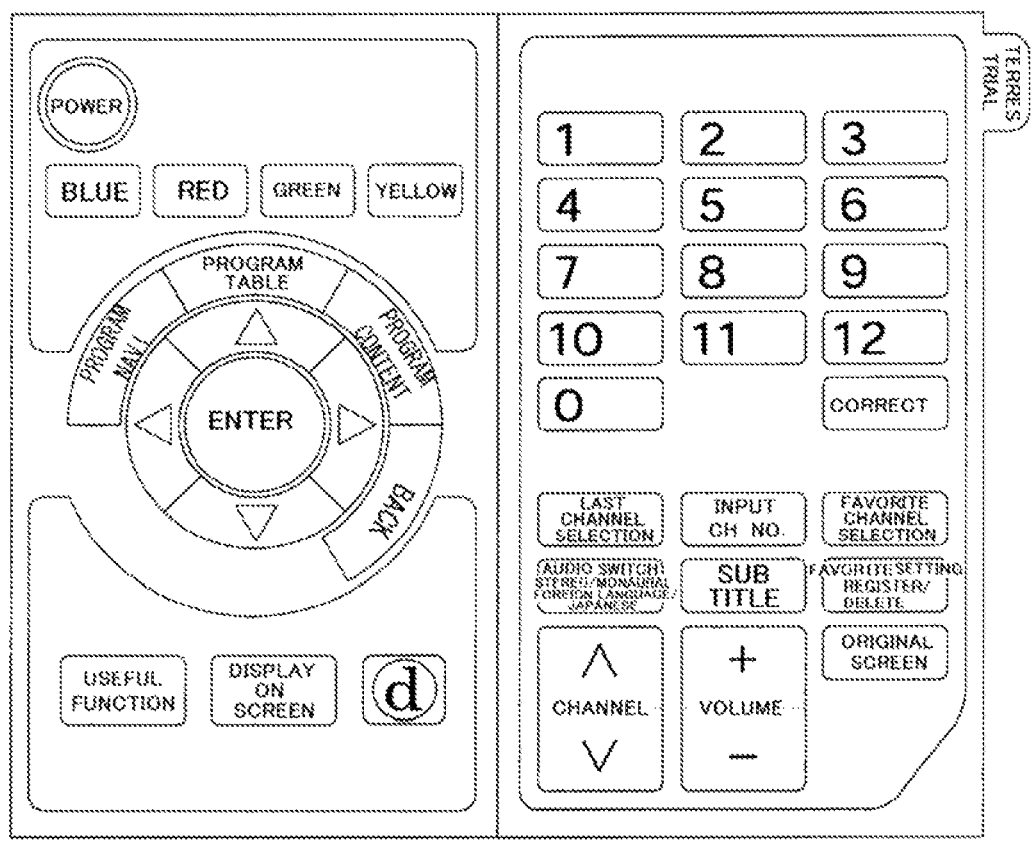
FIG. 23 is a diagram (1) showing an illustrative embodiment of a paper controller.
Figure 24:
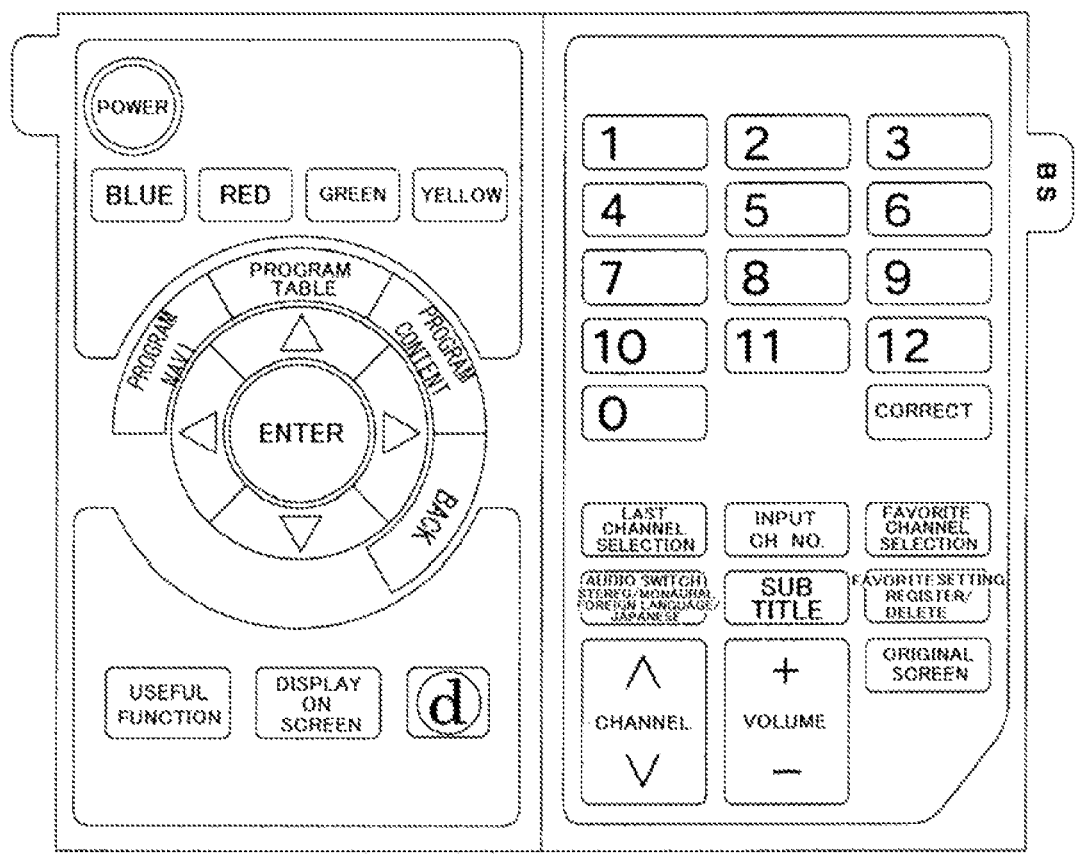
FIG. 24 is a diagram (2) showing an illustrative embodiment of a paper controller.
Figure 25:
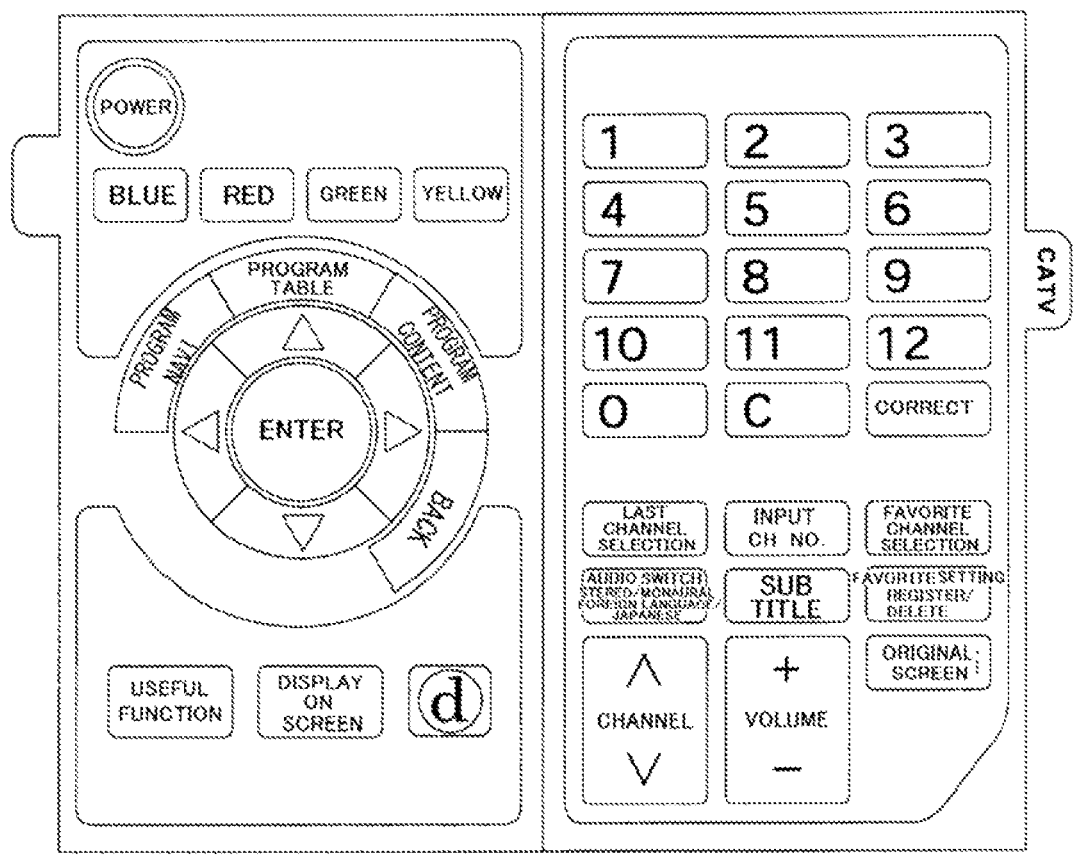
FIG. 25 is a diagram (3) showing an illustrative embodiment of a paper controller.
Figure 26:
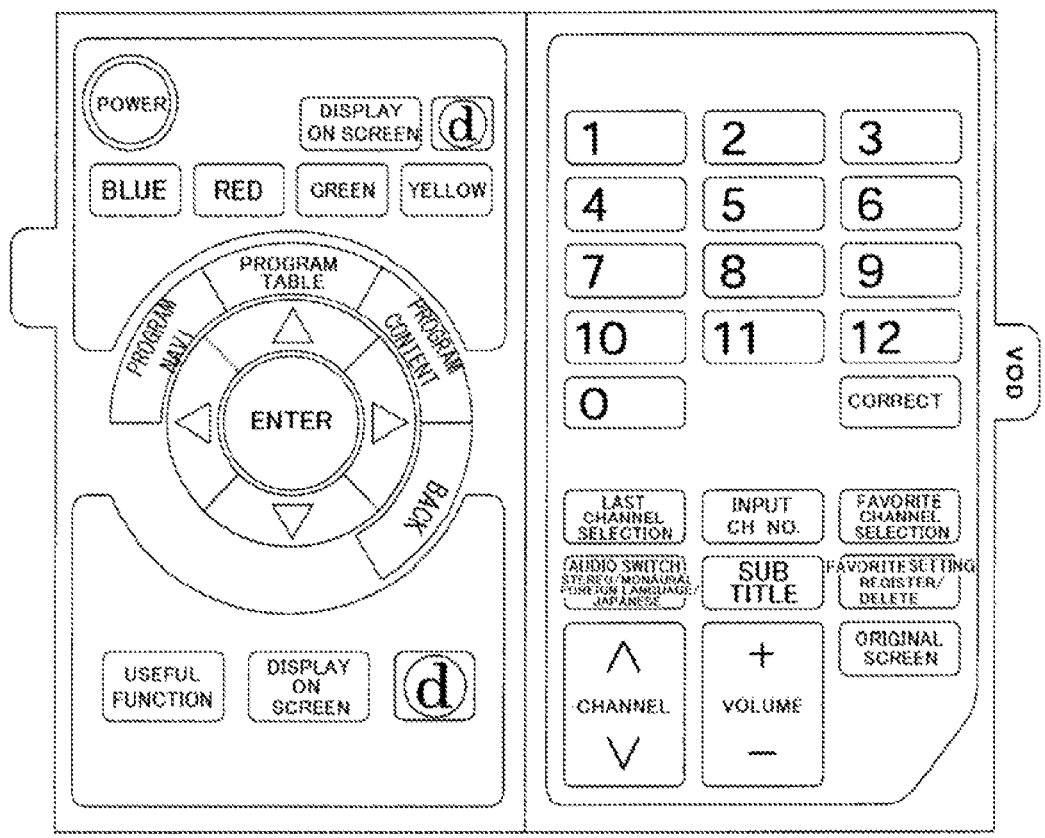
FIG. 26 is a diagram (4) showing an illustrative embodiment of a paper controller.
Figure 27:
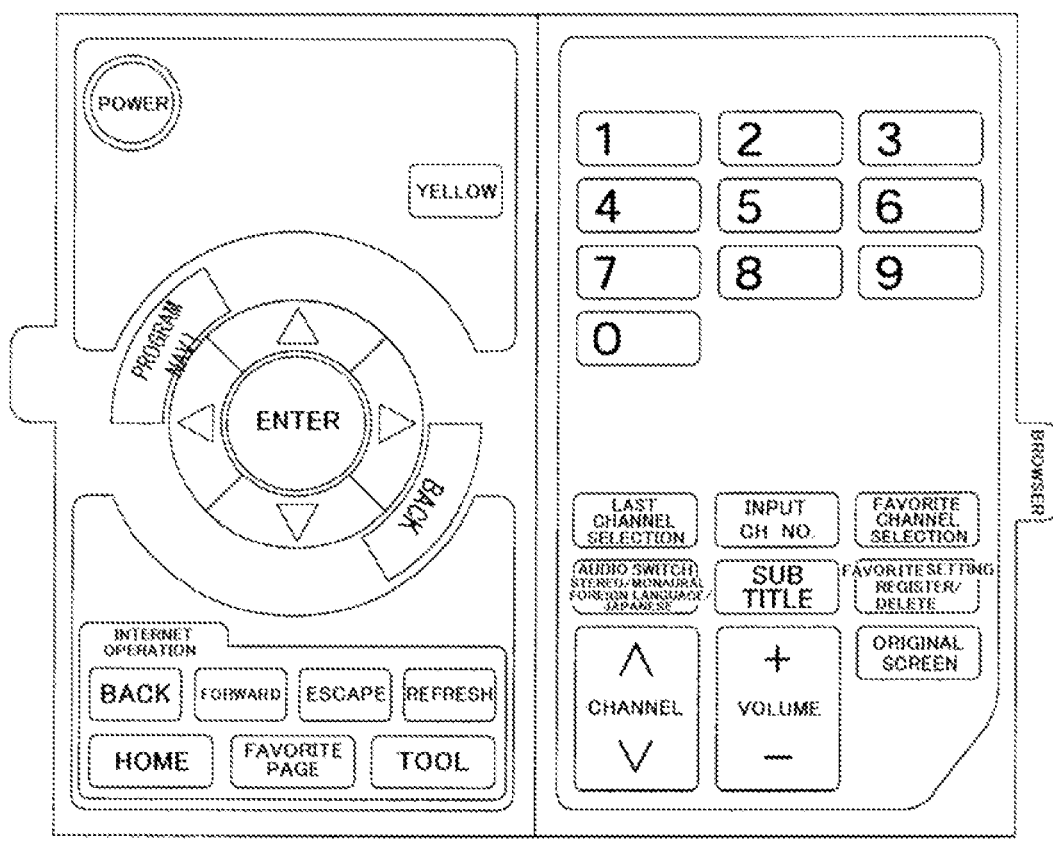
FIG. 27 is a diagram (5) showing an illustrative embodiment of a paper controller.
Figure 28:
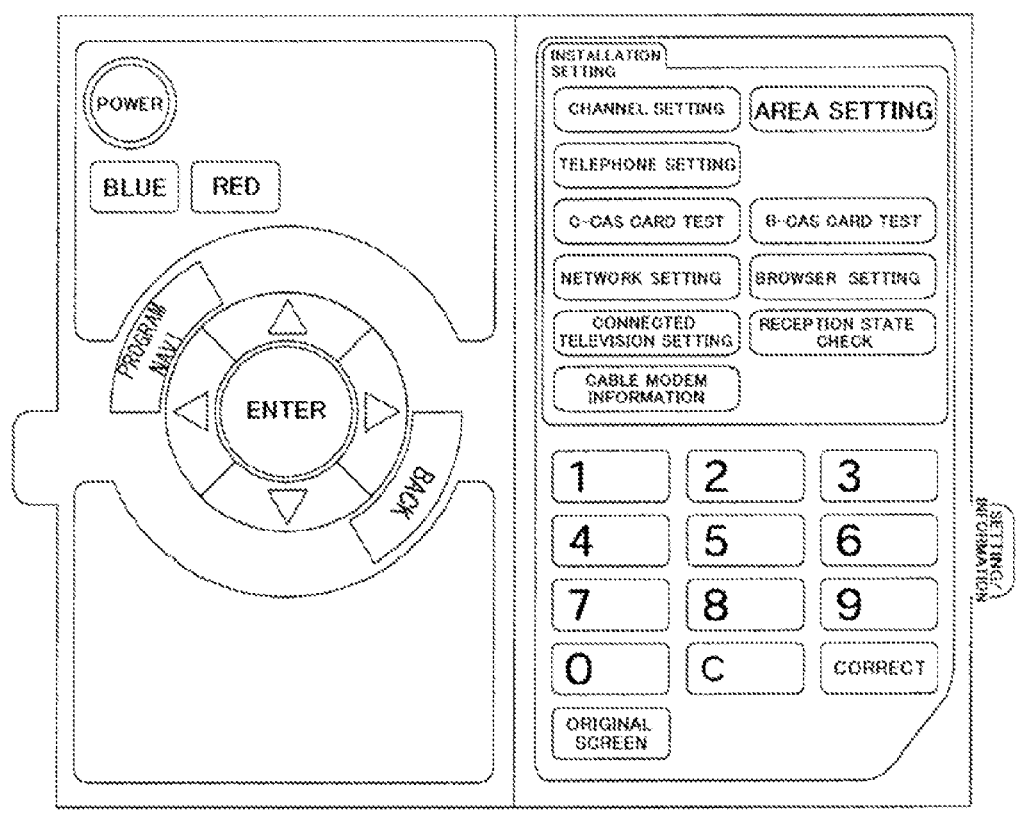
FIG. 28 is a diagram (6) showing an illustrative embodiment of a paper controller.
Figure 29:
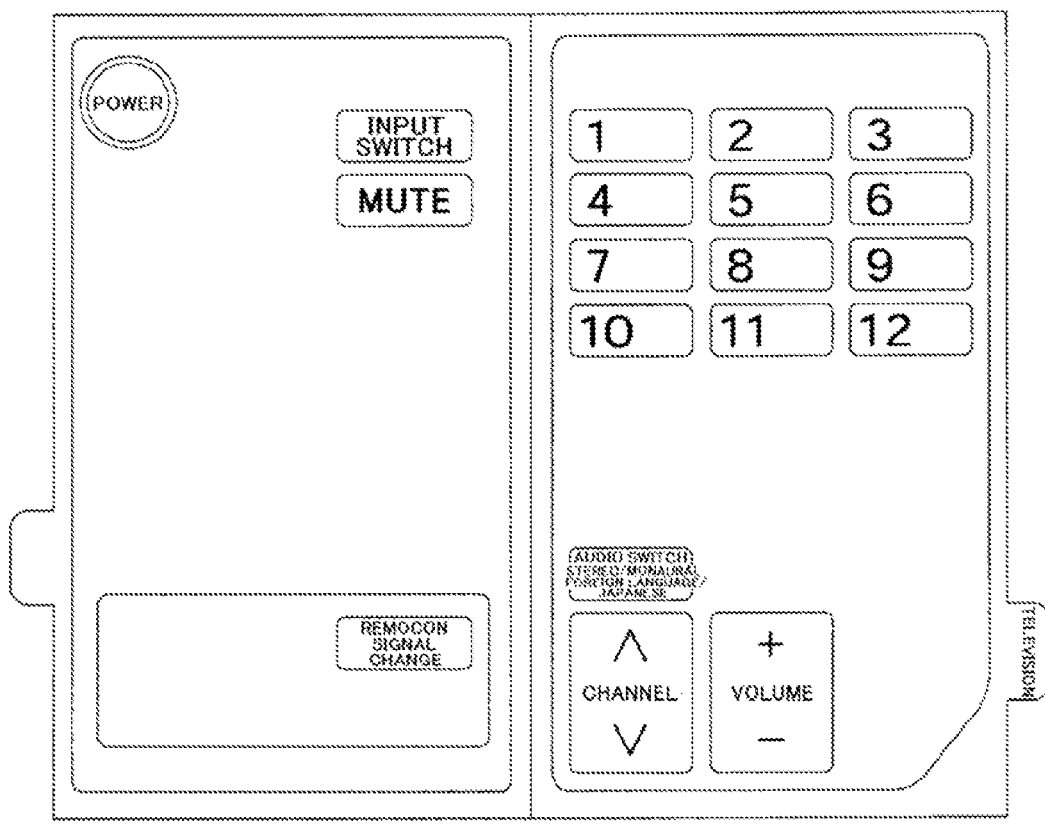
FIG. 29 is a diagram (7) showing an illustrative embodiment of a paper controller.
Figure 30:
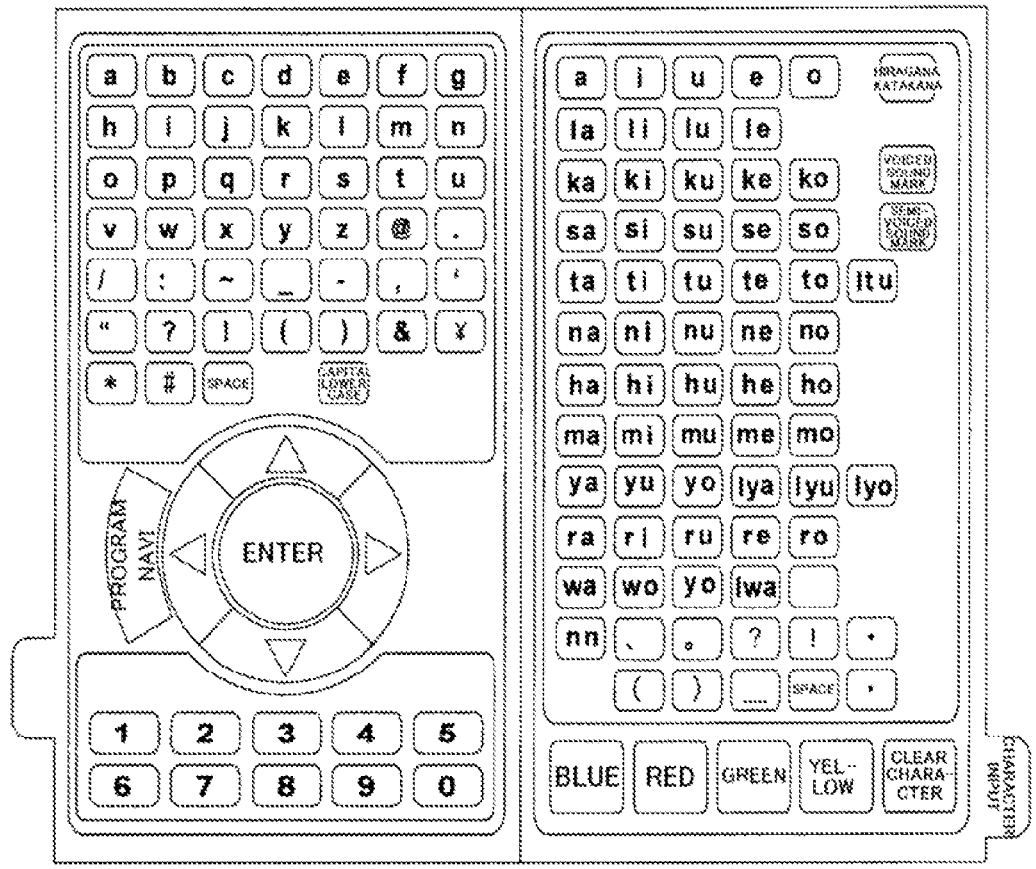
FIG. 30 is a diagram (8) showing an illustrative embodiment of a paper controller.

FIG. 21 is a diagram illustrating a process when a user purchased a new product.

As shown in FIG. 21, it is assumed that a user purchased a television of A manufacturer. In this case, the flash memory of the input device registers an infrared code table for the television of A manufacturer.

Next, a user additionally purchases a CD player of A manufacturer and a STB (set-top box) of B manufacturer. At this time, a user accesses web-sites of the manufacturers and registers the products. A PC (a terminal device) accesses a server (a manufacturer server or a common server) through a network and downloads infrared code tables for the CD player of A manufacturer and STB of B manufacturer or data to be registered in the infrared code tables. Subsequently, a PC transfers the downloaded infrared code tables or data of the infrared code tables to an input device by connecting to the input device wiredly or wirelessly. The input device, as shown in FIGS. 22A and 22B, adds and updates the received infrared code tables.

Specifically, the input device, as shown in FIG. 22A, first registers an infrared code table only for a television of A manufacturer. When infrared code tables for a CD player of A manufacturer and a STB of B manufacturer is transferred from a PC, as shown in FIG. 22B, those infrared code tables are added and the infrared code table is updated.

In this way, the input device can be also used for the CD player of A manufacturer and STB of B manufacturer, in addition to the television of A manufacturer.

It should be noted that, although, in this embodiment, an infrared code was downloaded from a server, the invention is not limited to this; an infrared code table or data of an infrared code table of an additionally purchased product may be stored in advance In a storage medium such as a USB memory, SD card, or memory stick, and the infrared code table etc. may be transferred to a PC by connecting the storage medium to the PC.

Moreover, such a storage medium may be connected to the input device and an infrared code table or data to be registered to the infrared code table may he transferred to the input device to update the infrared code table.

The PC is connected to a PRN (printer), and a dot pattern corresponding to the issued dot code may be printed on a paper-form medium together with graphic data.

FIGS. 16, 23 to 30 show examples of paper media, and are paper controller where images, texts, and symbols representing operations of a control-subject apparatus such as a television arc superimposed and printed on dot patterns.

Figure 31:
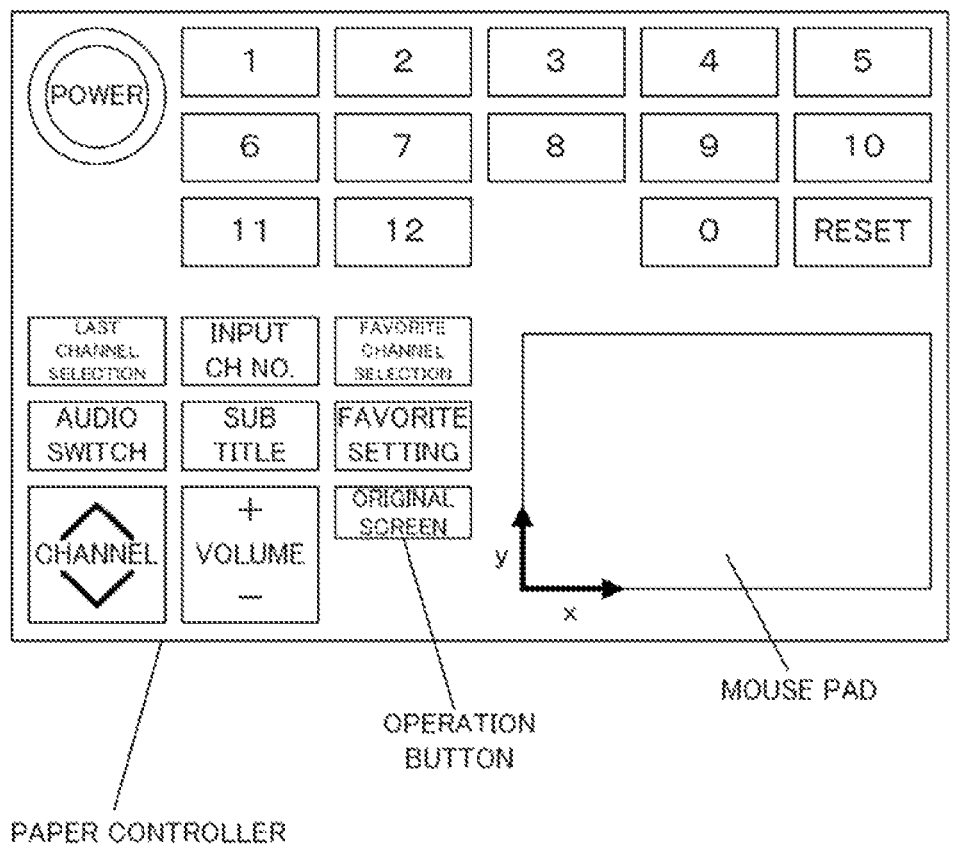
FIG. 31 is a diagram showing a paper controller on which a mouse pad is mounted.

Additionally, a paper controller may be equipped with a mouse pad region as shown in FIG. 31. The mouse pad region is superimposed and printed with a dot pattern registering XY coordinates, and when a user moves the reading unit of the input device on the mouse pad region, a cursor on the display moves according to the distance and direction of the motion.

It should be noted that, in the present invention, the paper medium is not limited to a paper controller and may take other embodiments including a sticker.

Or, a general paper controller or a sticker on which a dot pattern is printed in advance may be used, or a new dot pattern may be generated.

Next, a technique for creating a paper controller by a user him- or her-self is described.

The memory of a terminal device such as a PC (personal computer) includes an image layout unit which has graphic data of an image, text, or symbol representing an operation of a control-subject apparatus—the graphic data corresponds one or a plurality of sheets of paper controllers, and a table update unit for updating an infrared table which relates a dot code defined in the graphic data with an infrared code.

If a user specifies a desired control command (e.g., channel name, operation instruction) on a display connected to a PC, a paper controller on which a graphic for the control command and a dot pattern are printed is generated.

Here, a template of a paper controller prepared in advance may he printed with a control command that a user wants to use, or a user may decide an image layout to generate a controller.

As such, since a paper controller can be customized specially for an individual user, a paper controller with high convenience and flexibility may be provided.

Figure 32:
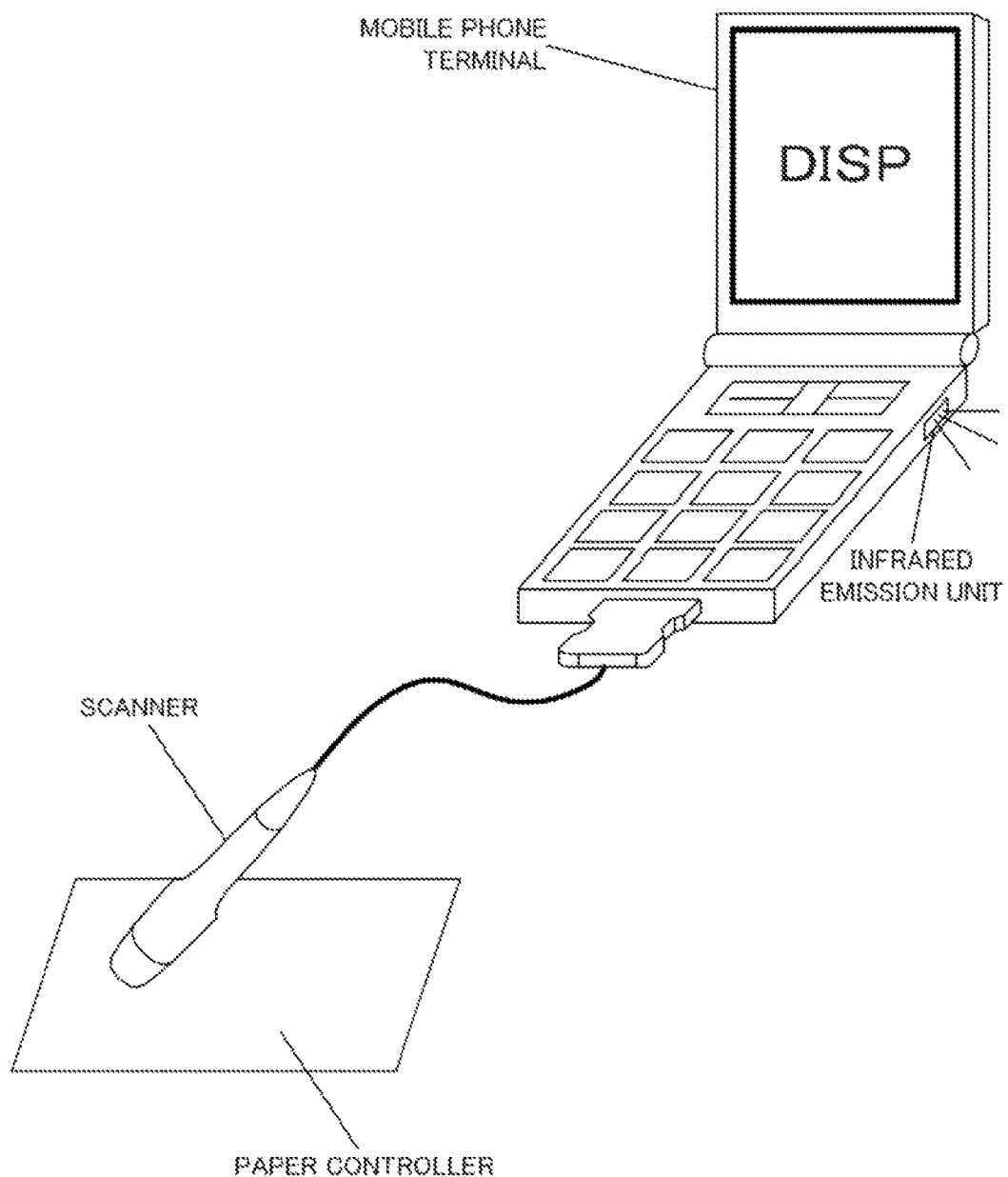
FIG. 32 is a diagram illustrating a remocon system using a mobile phone terminal.

FIG. 32 is a diagram illustrating a case in which a scanner connected to a general mobile phone terminal is used as an input device.

In this embodiment, if a scanner reads out a dot pattern printed on a paper controller, the dot pattern is converted into a dot code by analysis software in the scanner, and the dot code is transmitted to the mobile phone terminal through a connector. The mobile phone terminal emits an infrared code from the infrared emission unit mounted on the terminal to a set-top box, television or the like.

It should be noted that, in FIG. 32, although the mobile phone terminal and scanner are connected through a connector, the present invention is not limited to this, and may be connected through wireless means such as Bluetooth. Also, the mobile phone terminal and the scanner may be an integral unit.

In this way, making up the input device only with a mobile phone and a scanner enables easier and more convenient use of the paper remocon of the present invention.

Figure 33:
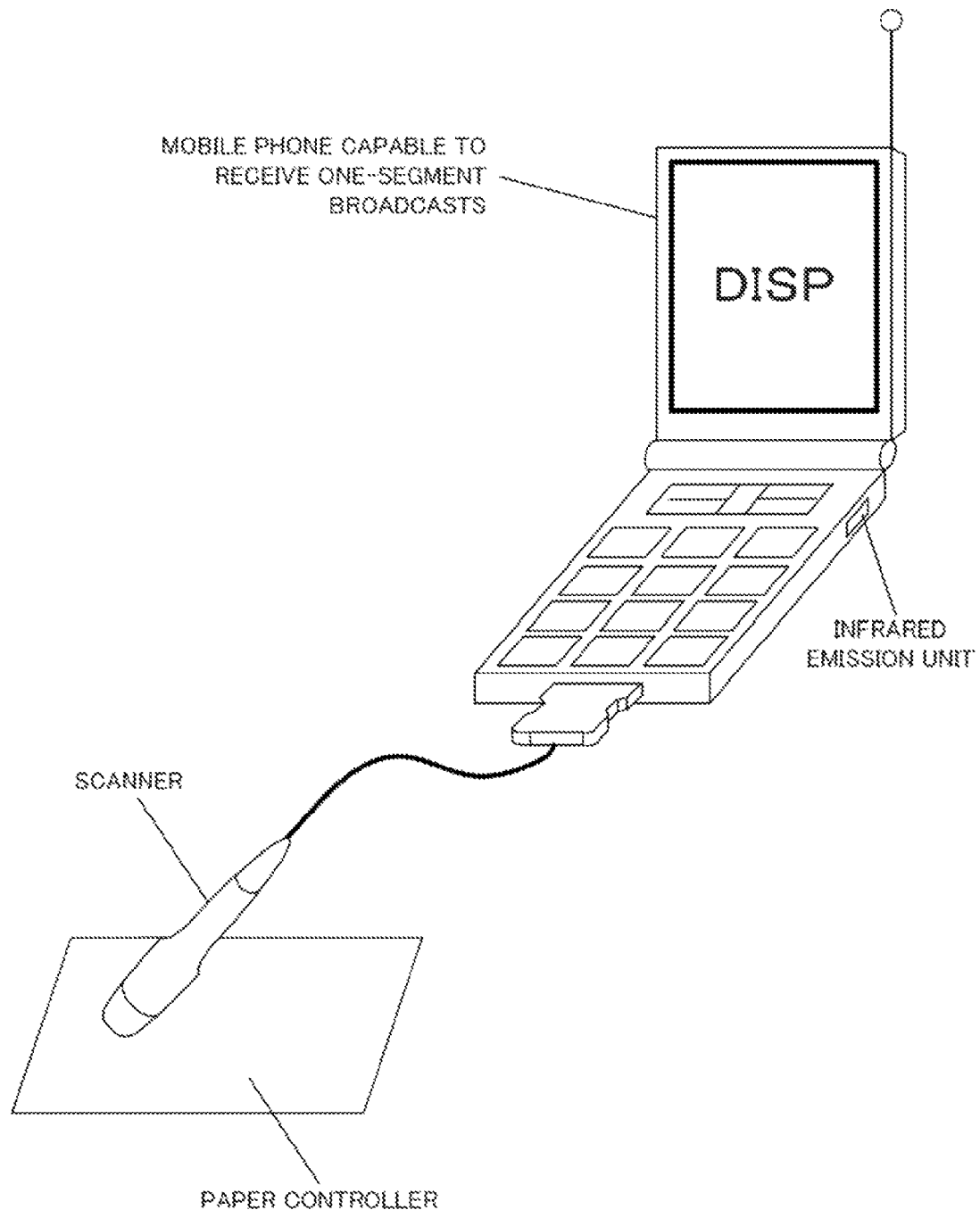
FIG. 33 is a diagram illustrating a remoson system using a mobile phone capable of receiving one-segment broadcasts.

FIG. 33 is a diagram illustrating a case in which the present invention is used for a mobile phone capable to receive one-segment broadcasts.

A mobile phone capable to receive one-segment broadcasts integrates an infrared emission unit and a display that can display television programs. That is, the input device and a television receiver as a control-subject apparatus are integrated.

A scanner is connected to such a mobile phone capable to receive one-segment broadcasts, through a connector. If a paper controller is clicked using the scanner, the scanner reads a dot pattern and converts the dot pattern into a dot code by an analysis device in the scanner. Subsequently, when the dot code is transmitted to the mobile phone capable to receive one-segment broadcasts, the mobile phone capable to receive one-segment broadcasts refers to an infrared code table registered in the flash memory and reads out an infrared code corresponding to the dot code, then transmits the infrared code from the infrared emission unit. In this way, the mobile phone capable to receive one-segment broadcasts receives radio waves signified by the infrared code from a broadcasting station, and displays a television program of the broadcasting station on the display (DISP).

Figure 34:
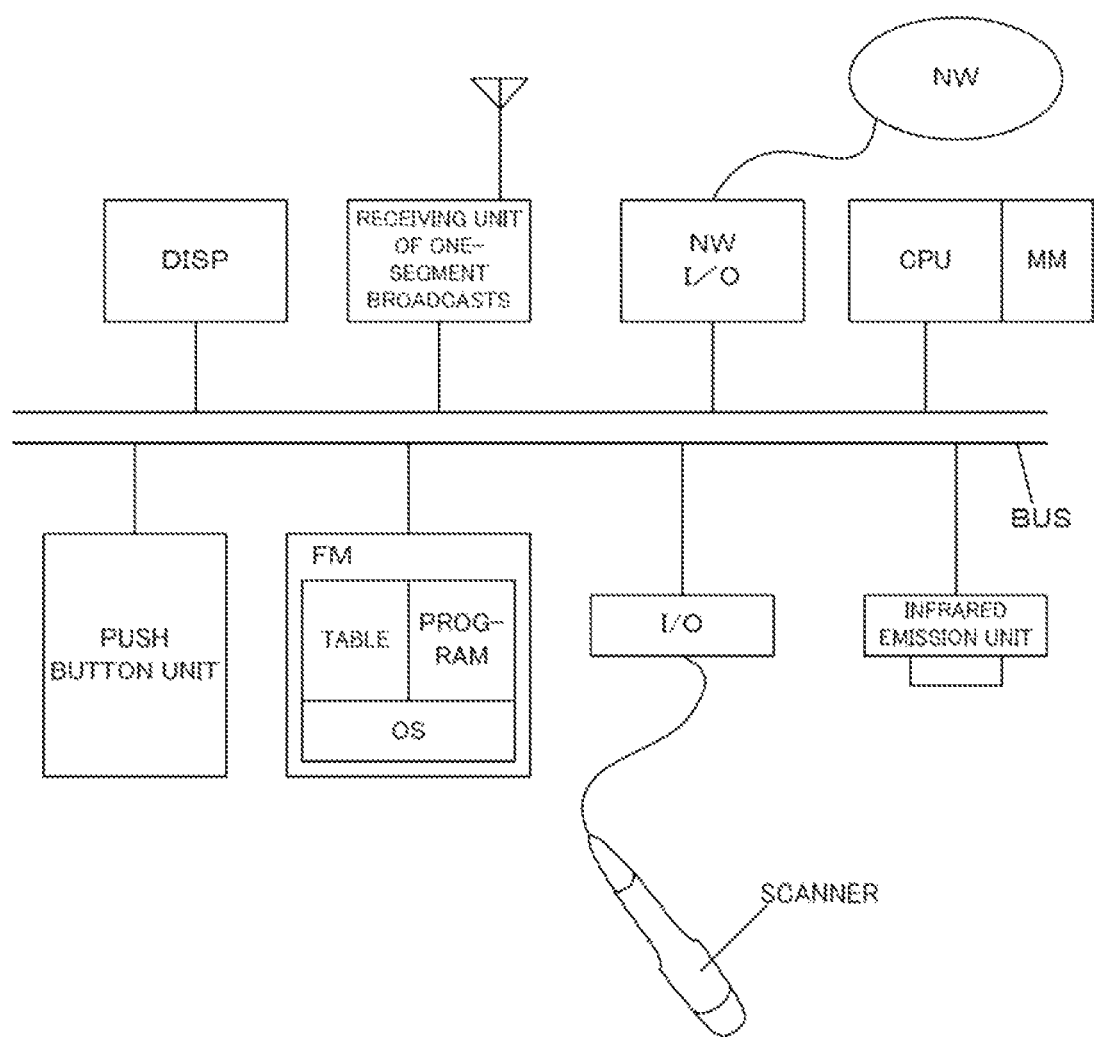
FIG. 34 is a hardware block diagram showing an internal structure of a mobile phone capable of receiving one-segment broadcasts.

FIG. 34 is a hardware block diagram illustrating a stricture of the mobile phone capable to receive one-segment broadcasts described above.

As shown in FIG. 34, the mobile phone capable to receive one-segment broadcasts comprises a main memory (MM), a flash memory (FM) connected through a bus, a display unit (DISP) as output means, a receiving unit of one-segment broadcasts, an infrared emission unit, and a push button unit, centering on a central processing unit (CPU).

Further, a scanner as imaging means is connected through I/O.

Although the internal structure of the scanner is not shown, the scanner incorporates an infrared irradiation means (LED), a filter which cuts out a predetermined wavelength element of the reflected light, and an imaging element for imaging (e.g., CCD and CMOS); the scanner is able to capture light reflected from a paper-form medium such as a paper controller, and process the dot pattern printed on the medium surface as image data.

Moreover, the bus (BUS) is connected to a general network (NW) such as the Internet through a network I/O (NW I/O) so that text information, image information, sound information, movie information, a program, and the like can be downloaded from a server not shown in FIG. 34.

The flash memory (FM) registers, as well as an operating system (OS), a program such as an analysis program of a dot pattern used in this embodiment and a variety of tables such as a dot code-infrared correspondence table.

The central processing unit (CPU) sequentially reads programs in the flash memory through a bus (BUS) and main memory (MM), then performs an execution process.

The receiving unit for receiving one-segment broad casts receives radio waves from a broadcasting transmission site.

Next, an embodiment where a program, an operation, and the like are registered to a paper controller is described.

Figure 35:
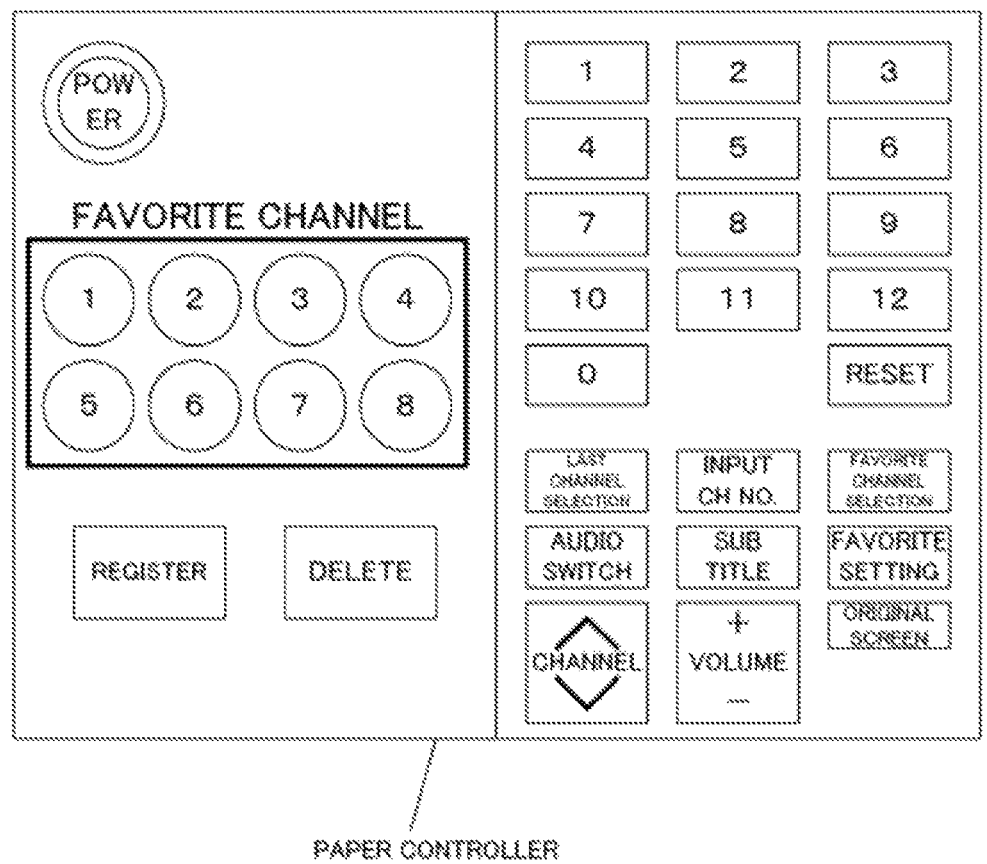
FIG. 35 is a diagram illustrating a paper controller that enables registering of a program, an operation, and the like to a dot pattern.

FIG. 35 is a diagram illustrating a paper controller that allows such a registration.

A power button and buttons for registering and configuring are printed on the left side of the paper controller. In the center of the left side, favorite channels are printed and these favorite channels are each superimposed and printed with a different dot pattern.

To register a program, an operation, and the like, there are a method for registering in the input device and a method for registering in a control-subject apparatus. Each method is described below.

(1) A method for registering a program, an operation, and the like in the input device First, a user clicks the register button on the input device. Then the CPU of the input device becomes ON for a registration, analyzes the history of the infrared code transmitted to a control-subject apparatus just before the register button is clicked, and reproduces the condition of the present control-subject apparatus. Then, the CPU selects one or a plurality of infrared codes.

Next, a user clicks one of favorite channel buttons on the input device. Then, the CPU relates the imaged dot pattern to the selected infrared code. That is, one or a plurality of infrared codes selected from the previous process is set as the infrared code corresponding to a dot pattern printed on the button, and additionally registered in a table in the FM (flash memory).

After the registration is completed, if a user clicks the favorite channel button, the CPU refers to the newly updated infrared code table and emits one or a plurality of infrared codes from the infrared emission unit to control the control-subject apparatus.

It should be noted that only the first click of the favorite channel buttons is valid. For example, if favorite channel 3 is clicked after clicking of favorite channel 1, an infrared code is registered only for 1 and not for 3. Further, if a button other than favorite channel is clicked, a registration is not performed. For example, if 12 channel button on the right side of the controller is clicked after clicking the register button, the registration mode is canceled from ON state and becomes OFF state, as a result, the registration process is not performed.

In addition, if a favorite channel button which has already registered is clicked, the CPU notifies that an infrared code has already registered for the button by causing a buzzer to generate a sound or an LED to light, or by causing both thereof.

If a user wants to delete a registration, the user should click the delete button, then click the favorite channel button the user wants to delete. Then the CPU deletes an infrared code table that has related to the clicked dot pattern.

(2) A method for registering a program, an operation, and the like in a control-subject apparatus First, a user clicks a register button of the input device. The CPU of the input device converts the imaged dot pattern into a dot code and transmits the dot code as a dot code signifying registration from an infrared emission unit to the receiver of a control-subject apparatus.

If the infrared receiving unit of the receiver receives the infrared code, the CPU in the receiver analyzes an operation that reproduces the condition of the present control-subject apparatus condition.

Next, a user clicks one of the favorite channel buttons on the input device. Then, the input device transmits an infrared code including a dot code analyzed from a dot pattern printed on the favorite channel from an infrared emission unit to the receiver of a control-subject apparatus.

When the receiver receives the dot code of the favorite channel, the CPU in the receiver relates the dot code of the favorite channel to an operation. That is, the CPU registers the operation selected from the previous process as the operation corresponding to the dot code, and the operation and the dot code are additionally registered in the dot code-operation table of the FM (flash memory) in the receiver.

After the registration is completed, if a user clicks the favorite channel, the input device emits an infrared code including a dot code printed on the favorite channel from the infrared emission unit. The receiver, when received the dot code, performs the newly set operation corresponding to the dot code.

It should be noted that the operation mentioned above is not limited to an operation such as setting a television channel, and includes accessing a specific server or a URL of the Internet.

This registration function can be used for a variety of media including the Internet, VOD (Video On Demand), terrestrial digital television, terrestrial analogue television, BS, CS, and cable television.

Figure 36:
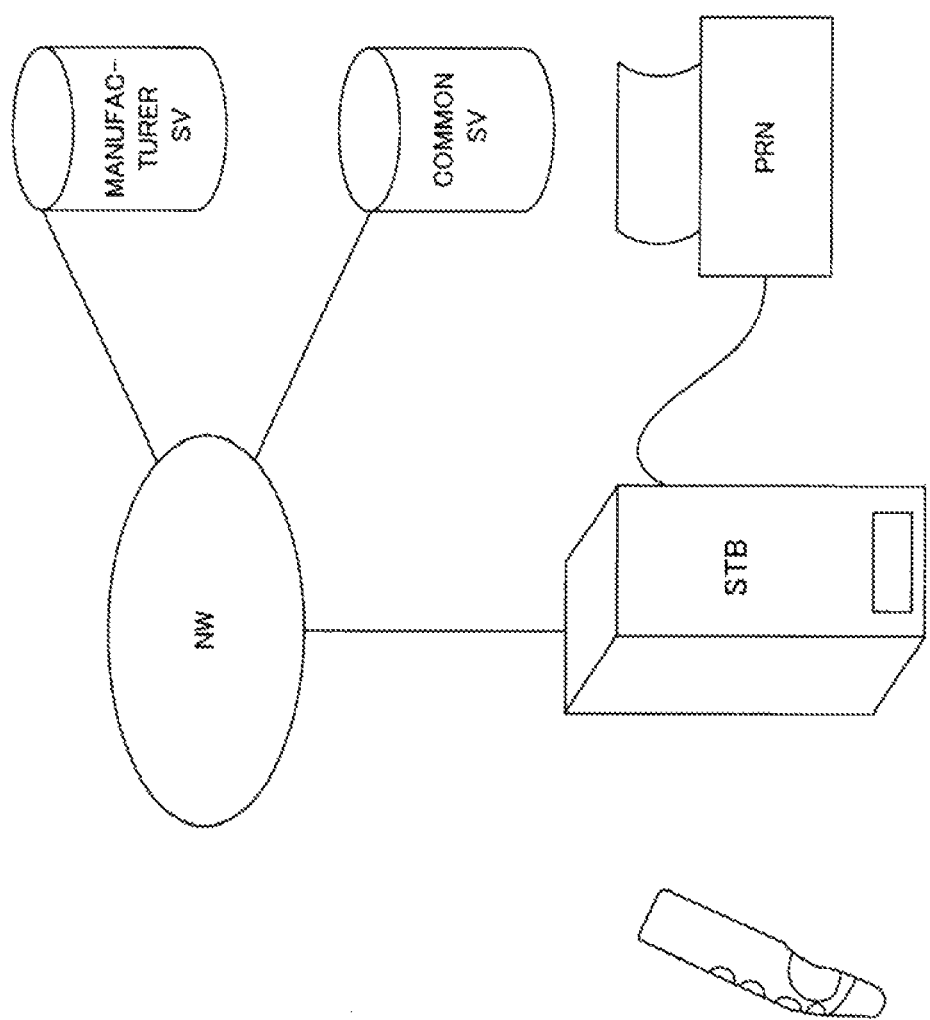
FIG. 36 is a diagram where a printer is connected to a set-top box that is connected to the Internet.

FIG. 36 is a diagram illustrating a system, in a system using the input device of the present invention, where a set-top box connected to the Internet is connected with a printer.

This system comprises a set-top box (STB) as a control-subject apparatus and a printer (PRN).

The set-top box receives broadcasting data and outputs, based on the input information from the input device, the broadcasting data to a monitor that is not shown in FIG. 36. The set-top box is connected to a printer.

The printer converts image data relating to the broadcasting data that was output on a monitor by the set-top box into print information and also converts code information relating to the broadcasting data into a dot pattern, then superimposes and prints them on a medium surface not shown in FIG. 36.

Here, image data is RGB data and print information is CMY data.

Print content is not limited to a paper controller, but a general information guide used with a television such as a program guide, mail order catalogue, free magazine, news, newspaper, and education is superimposed and printed with a dot pattern on a paper medium.

Specifically, for example, if a user gives a predetermined instruction to a set-top box when "this screen can be printed" or the like is displayed on the monitor, a figure, picture, text and the like displayed on the monitor screen is captured as a screen shot and image data and code information relating to the broadcasting data is superimposed and printed out with a dot pattern.

Another usage is, for example, printing a program guide. Data for a program guide is sent monthly instead of a program guide magazine being sent, and a user can print the data out by him- or her-self to create his or her own program guide (a push style). Also, a user can select a variety of data including a past program guide from a predetermined archive by him- or her-self and make a booklet specially for him- or her-self (a pull style).

It should be noted that the control unit of the input device, when an infrared code corresponding to a dot code does not exist in the infrared code table, may irradiate an infrared code where a manufacturer code defined for a set-top box or a predetermined specific manufacturer code is added to the read-out dot code, from the infrared emission unit of the input device to a set-top box.

The set-top box may be an ordinary set-top box, or otherwise an integration of television and set-top box, a recorder incorporating a set-top box function, a mobile information terminal capable of receiving one-segment broadcasts having a function similar to a set-top box, or the like.

Also, the input device may be a mobile information terminal which is connected to a dot pattern reading device wiredly or wirelessly or a mobile information terminal which incorporates a dot pattern reading device and is capable of connecting to a television monitor.

FIG. 37 is a diagram in which a television having a set-top box function is connected to the Internet and a printer.

In FIG. 37, a television as a control-subject apparatus is connected to a network and receives information relating to broadcasting data from a server that provides program information.

The program information indicates information relating to a program (e.g., a channel, broadcast, performer, related product purchasing information, advertising information, news, weather forecast, education material, quiz, fortune-telling, and game).

Further, the input device may store in advance an infrared code that has been transmitted to a control-subject apparatus, and transmit, when the input device is connected to a terminal device (PC), wiredly or wirelessly, the infrared code as user's viewing information, recording information, or purchasing information. In such case, the terminal device is connected to a network, and receives and displays, based on the viewing information, recording information, or purchasing information, information relating to the viewing information, recording information, or purchasing information.

Specifically, a remocon is used as a medium: information of content selected by a remocon is transmitted to a PC, and content downloaded through the Internet is superimposed and printed out with a dot pattern.

In this case, a television as a control-subject apparatus is not connected to a network, while PC is connected to a network.

For example, from a history of touching and reading of program guides, mail-order catalogues and the like, information including what program was selected, what was purchased, and the like is determined. That is, if a user wants to have a product or information shown on a television while watching a television program, and if the user tries to search some information, purchase something, or view the previous program again by touching a paper remocon or a book while watching the television program, the history is stored and accumulated in the remocon. The remocon is connected to a PC to transmit the information to the PC, and, according to the information, acquires information from the Internet. The user can use the information by viewing the information on the PC screen or printing out the information.

Moreover, for example, a one-way television that is not connected to the Internet can also be used in the following way:

The remocon have a clock function, thus, a user can recognize time.

The remocon stores a history of user operations including the user's preference of recording or watching of a certain program during a certain time period on a certain channel, preference of a cloth, preference of information of a product, preference of news broadcasted in a certain time period.

When a user wants to draw the information relating to such an operation history again through the Internet, the remocon plays as a medium between the television and a PC.

As a result, for example, if a movie of some product is shown in a commercial, and a user watches the channel and operates to purchase the product, the user can identify a commercial during this time period by using a PC to refer to a table in a predetermined server through the Internet, thus the user can identifies the purchasing information of the product introduced in the commercial. The table may be a time table, channel table, or XY coordinate table, which is used when a user moves a cursor and performs a certain input operation using the remocon while watching the television program. Using such information allows a user to do a variety of things, since a PC can determines the operation information such as user's preferences of a product, information, purchasing, and reviewing when a certain image is shown during a certain time period and the remocon is directed to a certain position.

All of these can be done if a television is connected to the Internet, but are still possible with a television not connected to the Internet as described above.

It should be noted that although the input device described in each embodiment above transmits information such as an operation code using infrared rays to a receiver, the present invention is not limited to such a connection method and may be connected to a receiver by means of a variety of connection methods such as a wireless communication, optical communication, wired communication, and the like.

Industrial Applicability

The present invention may be used for controls of home electric appliances, such as setting of a channel and tuning of volume for a television. Further, through an Internet connection, the present invention can be used for a variety of content including a mail-ordering, a karaoke, reserving, recording, and replaying of a broadband content, and a game.

The invention claimed is:

1. An input device for an apparatus using a dot pattern comprising:
    a reading unit for reading out a dot pattern formed based on a predetermined rule on a medium surface;
    a converting unit for analyzing a dot pattern from image information of the dot pattern read out by the reading unit and converting the dot pattern into a dot code corresponding to the dot pattern;
    an infrared code table for registering one or a plurality of infrared codes that arc related with the dot code: and
    a control unit for causing an infrared code read out from the infrared code table to be irradiated from an infrared emission unit to a control-subject apparatus, or when the infrared code corresponding to the dot code does not exist in the infrared code table, causing an infrared code where a manufacturer code defined for the control-subject apparatus or a predetermined specific manufacturer code is added to the read-out dot code to be irradiated from the infrared emission unit to the control-subject apparatus.

2. The input device for the apparatus using the dot pattern according to claim 1, wherein, in the infrared code table, a plurality of infrared codes are related with one dot code, and the control unit controls the infrared emission unit such that the infrared emission unit irradiates the plurality of infrared codes continuously or in a predetermined interval to the control-subject apparatus.

3. The input device for the apparatus using the dot pattern according to claim 1, wherein, if a dot code obtained from a dot pattern read out by the reading unit includes a dot code transmit command code, the control unit causes an infrared code where the read-out dot code is added to the manufacturer code to be irradiated from the infrared emission unit to the control-subject apparatus, or if the dot code obtained from a dot pattern read out by the reading unit includes a specific manufacturer code that signifies a specific manufacturer name, the control unit causes an infrared code where the read-out dot code is added to the specific manufacturer code to be irradiated from the infrared emission unit to the control-subject apparatus.

4. The input device for the apparatus using the dot pattern according to claim 1, wherein a receiver of the control-subject apparatus receives a dot code, to which the manufacturer code or the specific manufacturer code is added, as an infrared code and further comprises:
    a receiving unit for receiving the infrared code;
    an operation table in which an operation instruction code for the control-subject apparatus related to the dot code is registered; and
    an operation control unit for causing the control-subject apparatus to perform an operation based on the operation instruction code, wherein, if the operation control unit reads out an infrared code which includes the dot code, the operation control unit causes the control-subject apparatus to perform an operation according to the dot code.

5. The input device for the apparatus using the dot pattern according to claim 4, wherein, if the operation control unit refers to the operation table and an operation instruction code corresponding to the dot code does not exist; if the dot code includes an instruction to access a specified server; or if the operation control unit receives a dot code to which a specific manufacturer code is added, the operation control unit, in each case, accesses a predetermined and specified server through a network and transmits to the specified server the read-out dot code to follow a process and instruction of the specified server.

6. The input device for the apparatus using the dot pattern according to claim 1, wherein the input device is connected to a terminal device for registering a new control-subject apparatus to the input device so that the new control-subject apparatus can be controlled by the input device, wherein the terminal device transfers an infrared code table or infrared code data to be registered to the infrared code table from a server connected through a network or a storage medium mounted on the terminal device to the input device to update the infrared code table.

7. The input device for the apparatus using the dot pattern according to claim 6, wherein the terminal device is connected to a printer to enable printing of a dot pattern on a paper-form medium together with graphic data.

8. The input device for the apparatus using the dot pattern according to claim 7, wherein a paper controller is the paper-form medium on which graphic data including an image, text, or symbol which represents an operation of a control-subject apparatus is superimposed and printed on the dot pattern.

9. The input device for the apparatus using the dot pattern according to claim 1, wherein the input device is connected to a terminal device for registering a new control-subject apparatus so that the new control-subject apparatus can be controlled by the input device, the terminal device comprising:
    an image layout unit whose graphic data of an image, text, or symbol represents an operation of the control-subject apparatus, the graphic data corresponding to one or a plurality of sheets of paper controllers; and
    a table updating unit for updating an infrared code table which relates a dot code defined for the graphic data with an infrared code,
    wherein the terminal device is capable of creating the paper controller on which a graphic corresponding to a control command that a user desires to use is superimposed and printed on a dot pattern.

10. The input device for the apparatus using the dot pattern according to claim 1, wherein the input device incorporates the reading unit or the input device is a mobile phone terminal connected to the reading unit wiredly or wirelessly.

11. The input device for the apparatus using the dot pattern according to claim 1, wherein the input device is connected to a control-subject apparatus over a wireless communication, optical communication, wired communication or any other communication methods, instead of via infrared rays.

12. The input device for the apparatus using the dot pattern according to claim 1, wherein the dot code includes XY coordinates instead of a code or includes XY coordinates with a code.

13. A printing method by use of a system having an input device for an apparatus using a dot pattern comprising:
 a reading unit for reading out a dot pattern formed on a medium surface based on a predetermined rule,
 a converting unit for analyzing a dot pattern from image information of the dot pattern read out by the reading unit and converting the dot pattern into a dot code corresponding to the dot pattern,
 an infrared code table for registering one or a plurality of infrared codes related to the dot code,
 a control unit for causing the infrared code read out from the infrared code table to be irradiated from an infrared emission unit to a control-subject apparatus; and
 a set-top box as the control-subject apparatus, and
 a printer connected with the set-top box,
 the set-top box receives broadcasting data, and according to input information of the input device, outputs the broadcasting data on a monitor, the printer converts image data relating to the broadcasting data that the control-subject apparatus outputs on the monitor into print information, also converts code information relating to the broadcasting data into a dot pattern, then superimpose and print on a medium surface.

14. The printing method according to claim 7, wherein the control-subject apparatus is connected to a network and receives information related to broadcasting data from a server that provides program information.

15. The printing method according to claim 7, wherein the input device stores an infrared code that was transmitted to the control-subject apparatus, and when the input device is connected to the terminal device (PC) wiredly or wirelessly, the input device transmits the infrared code as user's viewing information or recording information, shopping information,
 wherein the terminal device is connected to a network and receives and displays, according to the viewing information or the recording information, information related to the viewing information or the recording information from a server which provides program information.

* * * * *

UNITED STATES PATENT AND TRADEMARK OFFICE
CERTIFICATE OF CORRECTION

| | |
|---|---|
| PATENT NO. | : 8,416,304 B2 |
| APPLICATION NO. | : 12/664270 |
| DATED | : April 9, 2013 |
| INVENTOR(S) | : Kenji Yoshida |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 396 days.

Signed and Sealed this
Second Day of December, 2014

Michelle K. Lee
*Deputy Director of the United States Patent and Trademark Office*